US010226869B2

(12) United States Patent
Chizeck et al.

(10) Patent No.: US 10,226,869 B2
(45) Date of Patent: Mar. 12, 2019

(54) HAPTIC VIRTUAL FIXTURE TOOLS

(71) Applicant: UNIVERSITY OF WASHINGTON, Seattle, WA (US)

(72) Inventors: Howard Jay Chizeck, Seattle, WA (US); Andrew Stewart, Seattle, WA (US); Fredrik Ryden, Seattle, WA (US)

(73) Assignee: University of Washington, Seattle, WA (US)

( * ) Notice: Subject to any disclaimer, the term of this patent is extended or adjusted under 35 U.S.C. 154(b) by 49 days.

(21) Appl. No.: 15/123,394

(22) PCT Filed: Mar. 2, 2015

(86) PCT No.: PCT/US2015/018320
§ 371 (c)(1),
(2) Date: Sep. 2, 2016

(87) PCT Pub. No.: WO2015/134391
PCT Pub. Date: Sep. 11, 2015

(65) Prior Publication Data
US 2017/0106537 A1    Apr. 20, 2017

Related U.S. Application Data

(60) Provisional application No. 61/947,181, filed on Mar. 3, 2014.

(51) Int. Cl.
B25J 9/00        (2006.01)
B25J 9/16        (2006.01)
G05B 19/427      (2006.01)

(52) U.S. Cl.
CPC .......... B25J 9/1689 (2013.01); G05B 19/427 (2013.01); G05B 2219/40122 (2013.01)

(58) Field of Classification Search
CPC ........ B25J 9/1689; B25J 9/1612; B25J 9/163; B25J 13/08; G05B 2219/39543;
(Continued)

(56) References Cited

U.S. PATENT DOCUMENTS 5,634,039 A    5/1997 Simon et al.
6,084,587 A    7/2000 Tarr et al.
(Continued)

FOREIGN PATENT DOCUMENTS

EP    2721463        4/2012
WO    1995020788     8/1995
(Continued)

OTHER PUBLICATIONS

Abbott, et al., "Haptic virtual fixtures for robot-assisted manipulation," Robotics Research, pp. 49-64, 2007.
(Continued)

Primary Examiner — Dalena Tran
(74) Attorney, Agent, or Firm — McDonnel Boehnen Hulbert & Berghoff

(57) ABSTRACT

Apparatus and methods for defining and utilizing virtual fixtures for haptic navigation within real-world environments, including underwater environments, are provided. A computing device can determine a real-world object within a real-world environment. The computing device can receive an indication of the real-world object. The computing device can determine a virtual fixture that corresponds to the real-world object based on the indication, where aspects of the virtual fixture are configured to align with aspects of the real-world object. The computing device can provide a virtual environment for manipulating the robotic tool to operate on the real-world object utilizing the virtual fixture. The virtual fixture is configured to provide haptic feedback based on a position of a virtual robotic tool in the virtual environment that corresponds to the robotic tool in the real-world environment.

21 Claims, 12 Drawing Sheets

(58) Field of Classification Search
CPC ........... G05B 2219/40053; G05B 2219/40131; G05B 2219/40122; A61B 2090/365; A61B 34/30; A61B 34/70; A61B 34/71; A61B 34/76
USPC ........ 700/245, 253, 257; 382/141, 154, 285; 703/1, 2; 901/2, 14, 41
See application file for complete search history.

(56) References Cited

U.S. PATENT DOCUMENTS

| | | | |
|---|---|---|---|
| 6,104,158 | A | 8/2000 | Jacobus et al. |
| 6,191,796 | B1 | 2/2001 | Tarr |
| 6,421,048 | B1 | 7/2002 | Shih et al. |
| 6,493,608 | B1* | 12/2002 | Niemeyer ............. B25J 9/1689 606/130 |
| 6,597,347 | B1 | 7/2003 | Yasutake |
| 6,704,694 | B1 | 3/2004 | Basdogan et al. |
| 7,084,867 | B1 | 8/2006 | Ho et al. |
| 7,084,869 | B2 | 8/2006 | Sriram et al. |
| 7,191,014 | B2 | 3/2007 | Stewart et al. |
| 7,599,071 | B2 | 10/2009 | Dillon et al. |
| 7,885,732 | B2 | 2/2011 | Troy |
| 8,049,892 | B2 | 11/2011 | Shakespeare et al. |
| 8,398,541 | B2* | 3/2013 | DiMaio ............. A61B 19/2203 348/211.3 |
| 8,508,646 | B2 | 8/2013 | Katerberg |
| 9,001,190 | B2 | 4/2015 | Olivier, III et al. |
| 9,471,142 | B2 | 10/2016 | Chizeck et al. |
| 9,477,307 | B2 | 10/2016 | Chizeck et al. |
| 2003/0112281 | A1 | 6/2003 | Sriram et al. |
| 2005/0065658 | A1 | 3/2005 | Green |
| 2005/0148432 | A1 | 7/2005 | Carmein |
| 2006/0049939 | A1 | 3/2006 | Haberer et al. |
| 2006/0142657 | A1 | 6/2006 | Quaid |
| 2007/0142751 | A1 | 6/2007 | Kang et al. |
| 2007/0142968 | A1 | 6/2007 | Prisco et al. |
| 2008/0103639 | A1 | 5/2008 | Troy et al. |
| 2008/0218514 | A1 | 9/2008 | Tarr et al. |
| 2008/0240502 | A1 | 10/2008 | Freedman et al. |
| 2009/0278915 | A1 | 11/2009 | Kramer et al. |
| 2010/0063630 | A1 | 3/2010 | Sutherland et al. |
| 2011/0066406 | A1 | 3/2011 | Tsai et al. |
| 2011/0119224 | A1 | 5/2011 | Mangione-Smith |
| 2012/0109150 | A1 | 5/2012 | Quaid et al. |
| 2013/0096575 | A1 | 4/2013 | Olson |
| 2013/0147789 | A1 | 6/2013 | Kim |
| 2013/0169423 | A1 | 7/2013 | Iorgulescu et al. |
| 2013/0218472 | A1 | 8/2013 | Fu et al. |
| 2013/0274596 | A1 | 10/2013 | Azizian et al. |
| 2013/0286004 | A1 | 10/2013 | McCulloch et al. |
| 2014/0168073 | A1 | 6/2014 | Chizeck et al. |
| 2014/0320392 | A1 | 10/2014 | Chizeck et al. |
| 2014/0320489 | A1 | 10/2014 | Chizeck et al. |
| 2014/0320629 | A1 | 10/2014 | Chizeck et al. |
| 2017/0024014 | A1 | 1/2017 | Chizeck et al. |

FOREIGN PATENT DOCUMENTS

| | | |
|---|---|---|
| WO | 2008120217 A2 | 10/2008 |
| WO | 2009/045827 A2 | 4/2009 |
| WO | 2009045827 | 4/2009 |
| WO | 2012126135 | 9/2012 |
| WO | 2012/174406 A1 | 12/2012 |
| WO | 2012174406 | 12/2012 |
| WO | 2013033122 A1 | 3/2013 |
| WO | 2015134391 | 9/2015 |

OTHER PUBLICATIONS

Abbott, et al., "Stable Forbidden-Region Virtual Fixtures for Bilateral Telemanipulation," Transactions of the ASME, Journal of Dynamic Systems, Measurement and Control, vol. 128, No. 1, pp. 53-64, 2006.

Anderson, et al., "The Optics of Human Skin," Journal of Investigative Dermatology, vol. 77, pp. 13-19, 1981.

Basdogan, et al., "Haptic Rendering in Virtual Environments," in Handbook of Virtual Environments, K. Stanney (Ed.), Lawrence Earlbaum: London, 2002.

Brown, et al., "Mechanical design and analysis for a scanning fiber endoscope," Proceedings of the 2001 ASME International Mechanical Engineering Congress and Exposition, New York, NY, vol. 51, pp. 165-166, 2001.

Burrus, "Kinect Calibration," available online at: http://nicolas.burras.name/index.php/Research/KinectCalibration, 2010.

BWH and 3D Slicer, "3D Slicer," available online at: http://www.slicer.org, 2015.

Cha, et al., "Haptic Interaction with Depth Video Media," Advances in Multimedia Information Processing—PCM 2005, pp. 420-430, 2005.

Colgate, et al., "Passivity of a class of sampled-data systems: Application to haptic interfaces," Journal of Robotic Systems, vol. 14, No. 1, pp. 37-47, ISSN: 0741-2223, 1997.

European Patent Office, Office Action dated Feb. 13, 2015, issued in connection with EP Application No. EP12733550.3, 8 pages.

Helferty, et al., "Videoendoscopic Distortion Correction and Its Application to Virtual Guidance of Endoscopy," IEEE Transactions on Medical Imaging, vol. 20, No. 7, pp. 605-617, 2001.

Henry et al., "RGB-D Mapping: Using Depth Cameras for Dense 3D Modeling of Indoor Environments," in Proceedings of the 12th International Symposium on Experimental Robotics (ISER), 2010.

Herrera, et al., "Accurate and Practical Calibration of a Depth and Color Camera Pair," Computer Analysis of Images and Patterns, Part II, vol. 6855 of the series Lecture Notes in Computer Science, pp. 437-445, 2011.

Hua, et al., "Development of 2D Microdisplay Using an Integrated Microresonating Waveguide Scanning System," Journal of Intelligent Material Systems and Structures, vol. 22, No. 14, pp. 1613-1622, epub Jun. 2011.

Hua, et al., "Development of a novel polymeric waveguide and micro actuator for micro scanning system," 19th International Conference on Adaptive Structures and Technologies, Ascona, Switzerland, pp. 1-10, 2008.

Jacques, et al., "Absorption spectra for biological tissues," available online at: http://omlc.ogi.edu/classroom/ece532/class3/muaspectra.html , 1998 (retrieved Oct. 2015).

Lloyd, et al., "Programming Contact Tasks Using a Reality-based Virtual Environment Integrated with Vision," in IEEE Transactions on Robotics and Automation, 1997.

Panergo, et al., "Resonant polymeric optical waveguide cantilever integrated for image acquisition," Journal of Lightwave Technology, vol. 25, No. 3, pp. 850-860, 2007.

International Searching Authority, International Search Report and Written Opinion dated Sep. 25, 2012, issued in connection with International Application No. PCT/US2012/042716, filed on Jun. 15, 2012, 14 pages.

International Searching Authority, International Search Report and Written Opinion dated Jun. 18, 2015, issued in connection with International Application No. PCT/US2015/018320, filed on Mar. 2, 2015, 9 pages.

Prime Sense LTD, "Reference design," available online at: http://www.primesense.com/?p=514, 2011.

Weissleder, "A clearer vision for in vivo imaging," Nature Biotechnology, vol. 19, pp. 316-317, 2001.

Ruspini, et al., "The haptic display of complex graphical environments," in Proceedings of the 24th annual conference on computer graphics and interactive techniques, pp. 345-352, 1997.

Rusu, et al., "3D is here: Point Cloud Library (PCL)," IEEE International Conference on Robotics and Automation (ICRA), pp. 1-4, 2011.

Ryden, (uploaded to YouTube Dec. 16, 2010) "Haptics using Kinect," available online at: https://www.youtube.com/watch?v=bcUCDns_7Qc, (retrieved on Feb. 9, 2015).

Ryden, et al., "A proxy method for real-time 3-dof haptic rendering of streaming point cloud data," IEEE Transactions Haptics, vol. 6, No. 3, pp. 257-267, 2013.

(56) References Cited

OTHER PUBLICATIONS

Ryden, et al., "Advanced Telerobotic Underwater Manipulation Using Virtual Fixtures and Haptic Rendering," MTS/IEEE Oceans Conference, San Diego, CA, pp. 1-8, 2013.
Ryden, et al., "Proxy Method for Fast Haptic Rendering from Time Varying Point Clouds," 2011 IEEE/RSJ International Conference on Intelligent Robots and Systems, pp. 2614-2619, 2011.
Ryden, et al., "Using KinectTM and a Haptic Interface for Implementation of Real-Time Virtual Fixtures," Proceedings of the 2nd Workshop on RGB-D: Advanced Reasoning with Depth Cameras (in conjunction with RSS 2011), Los Angeles, CA, pp. 1-5, 2011.
Sehgal, et al., "Real-Time Scale Invariant 3D Range Point Cloud Registration," Image Analysis and Recognition, Springer: Berlin, pp. 220-229, 2010.
Seibel, et al., "Single fiber flexible endoscope: general design for small size, high resolution, and wide field of view," in Proceedings of SPIE, Biomonitoring and Endoscopy Technologies, vol. 4158, pp. 29-39, 2001.
Stanton, "New rules for humidity in the OR," AORN Journal (online), available at: http://www.aorn.org/News/Managers/May2010Issue/Humidity, 2010.
Takahashi, et al., "Polymeric waveguide design of 2D display system," SPIE NDE Health Monitoring and Diagnostics, vol. 6177, pp. 617719-1-617719-9, 2006 (retrieved Oct. 2015).
Wang, et al., "1-D electro-optic beam steering device," Sensors and Actuators A: Physical, vol. 188, pp. 277-284, 2012.
Wang, et al., "1-D electro-optic beam steering device," 16th International Solid-State Sensors, Actuators and Microsystems Conference (Transducers 2011), Beijing, China, pp. 1570-1573, 2011.
Wang, et al., "2-D Mechanically Resonating Fiberoptic Scanning Display System," 2010 International Symposium on Optomechatronic Technologies (ISOT), Toronto, Canada, pp. 1-6, 2010.
Wang, et al., "Development of a microfabricated scanning endoscope using SU-8 based optical waveguide," SPIE NDE Health Monitoring and Diagnostics, vol. 5047, pp. 305-313, 2003.
Wang, et al., "Development of an electro-optic scanner for potential endoscope application," Journal of Medical Devices, vol. 3, No. 2, pp. 027522, 2009.
Wang, et al., "Development of an optical waveguide cantilever scanner," Proceedings of SPIE, vol. 4876, pp. 72-83, 2002.
Wang, et al., "Electro-optic polymer prism beam deflector," 21st Annual Meeting of the IEEE Lasers and Electro-Optics Society, Newport Beach, CA, pp. 579-580, 2008.
Wang, et al., "Electro-optic polymer prism beam deflector," Optical Engineering, vol. 48, No. 11, pp. 114601, 2009.
Wang, et al., "Micromachined optical waveguide cantilever as a resonant optical scanner," Sensors and Actuators A, vol. 102, pp. 165-175, 2002.
Wang, et al., "Scanning polymeric waveguide design of a 2D display system," IEEE Journal of Display Technology, vol. 1, No. 1, pp. 28-38, 2008.
Wang, et al., "Two-dimensional mechanically resonating fiber optic scanning display system," Optical Engineering, vol. 49, No. 9, pp. 097401-1-097401-8, 2010.
El-Far, et al. (2008) "An algorithm for Haptically Rendering Objects described by point clouds," IEEE, 001443-00148.
Kwok, G. Mylonas, L. Sun, M. Lerotic, J. Clark, T. Athanasiou, A. Darzi, and G. Yang, "Dynamic active constraints for hyper-redundant flexible robots," Medical Image Computing and Computer-Assisted Intervention—MICCAI 2009, pp. 410-417, 2009.
Bettini, S. Lang, A. Okamura, and G. Hager, "Vision assisted control for manipulation using virtual fixtures," vol. 2, pp. 1171-1176. [Online]. Available: ieeexplore.ieee.org/xpl/articleDetails.jsp?arnumber=976327.
Marayong and A. Okamura, "Speed-accuracy characteristics of human-machine cooperative manipulation using virtual fixtures with variable admittance," Human Factors: The Journal of the Human Factors and Ergonomics Society, vol. 46, No. 3, pp. 518-532, 2004.
Li, M. Ishii, and R. H. Taylor, "Spatial motion constraints using virtual fixtures generated by anatomy," Robotics, IEEE Transactions on, vol. 23, No. 1, pp. 4-19, Feb. 2007.
Kragic, P. Marayong, M. Li, A. Okamura, and G. Hager, "Human-machine collaborative systems for microsurgical applications," The International Journal of Robotics Research, vol. 24, No. 9, pp. 731-741, 2005.
Park, R. Howe, and D. Torchiana, "Virtual fixtures for robotic cardiac surgery," pp. 1419-1420, 2001.
Peshkin, J. Colgate, W. Wannasuphoprasit, C. Moore, R. Gillespie, and P. Akella, "Cobot architecture," Robotics and Automation, IEEE Transactions on, vol. 17, No. 4, pp. 377-390, 2001.
Davies, M. Jakopec, S. Harris, F. Rodriguez y Baena, A. Barrett, A. Evangelidis, P. Gomes, J. Henckel, and J. Cobb, "Active-constraint robotics for surgery," Proceedings of the IEEE, vol. 94, No. 9, pp. 1696-1704, 2006.
Becker, R. MacLachlan, G. Hager, and C. Riviere, "Handheld micromanipulation with vision-based virtual fixtures," in Robotics and Automation (ICRA), 2011 IEEE International Conference on, May 2011, pp. 4127-4132.
Dewan, P. Marayong, A. Okamura, and G. Hager, "Vision-based assistance for ophthalmic micro-surgery," in Medical Image Computing and Computer-Assisted Intervention MICCAI 2004, ser. Lecture Notes in Computer Science, C. Barillot, D. Haynor, and P. Hellier, Eds. Springer Berlin / Heidelberg, 2004, vol. 3217, pp. 49-57.
Li, A. Kapoor, and R. Taylor, "A constrained optimization approach to virtual fixtures," in Intelligent Robots and Systems, 2005. (IROS 2005). 2005 IEEE/RSJ International Conference on, Aug. 2005, pp. 1408-1413.
Park, J. Choi, Y. Park, and K. Sun, "Haptic virtual fixture for robotic cardiac catheter navigation," Artificial Organs, vol. 35, No. 11, pp. 1127-1131, 2011. [Online]. Available: dx.doi.org/10.1111/j.1525-1594.2011.01373.x.
Yamamoto, N. Abolhassani, S. Jung, A. Okamura, and T. Judkins, "Augmented reality and haptic interfaces for robot-assisted surgery," The International Journal of Medical Robotics and Computer Assisted Surgery, 2011.
Gibo, L. N. Verner, D. D. Yuh, and A. M. Okamura, "Design considerations and human-machine performance of moving virtual fixtures," in Robotics and Automation, 2009. ICRA '09. IEEE International Conference on, May 2009, pp. 571-676.
Ren, R. Patel, K. McIsaac, G. Guiraudon, and T. Peters, "Dynamic 3-d virtual fixtures for minimally invasive beating heart procedures," Medical Imaging, IEEE Transactions on, vol. 27, No. 8, pp. 1061-1070, Aug. 2008.
King, B. Hannaford, K.-W. Kwok, G.-Z. Yang, P. Griffiths, A. Okamura, I. Farkhatdinov, J.-H. Ryu, G. Sankaranarayanan, V. Arikatla, K. Tadano, K. Kawashima, A. Peer, T. Schauss, M. Buss, L. Miller, D. Glozman, J. Rosen, and T. Low, "Plugfest 2009: Global interoperability in telerobotics and telemedicine," in Robotics and Automation (ICRA), 2010 IEEE International Conference on, May 2010, pp. 1733-1738.
Quigley, B. Gerkey, K. Conley, J. Faust, T. Foote, J. Leibs, E. Berger, R. Wheeler, and A. Ng, "Ros: an open-source robot operating system," in ICRA workshop on open source software, vol. 3, No. 3.2, 2009.
Kosari, S. Ramadurai, H. J. Chizeck and B. Hannaford, "Robotic Compression of Soft Tissue," in International Conference on Robotics and Automation (IROS). IEEE, 2012.
Ramadurai, S. N. Kosari, H. H. King, H. J. Chizeck, B. Hannaford, "Application of Unscented Kalman Filter to a Cable Driven Surgical Robot: A Simulation Study," in International Conference on Robotics and Automation (IROS). IEEE, 2012.
Rydén and H. J. Chizeck, "A Method for Contraint-Based Six Degree-of-freedom Haptic Interaction with Streaming Point Clouds," IEEE Trans. on Robotics and Engineering, 2013.
Tassa, Y. and Erez, T. and Todorov, E. Fast Model Predictive Control for Reactive Robotic Swimming. 2011.
Freedy et al., "A computer-based Learing System for Remote Manipulator Control," IEEE, 1971.
Koppula et al., "Semantic labeling of 3d point clouds for indoor scenes." Advances in Neural Information Processing Systems. 2011.

(56) References Cited

OTHER PUBLICATIONS

Krainin et al., "Manipulator and object tracking for in-hand 3D object modeling," 2011.
Kuang et al., "Assembling Virtual Fixtures for Guidance in Training Environments," Haptic Interfaces for Virtual Environment and Teleoperator Systems, 2004. HAPTICS'04, Proceedings. 12th International Symposium on IEEE, 2004, pp. 367-374.
Leeper et al., "Constraint-Based 3-DOF Haptic Rendering of Arbitrary Point Cloud Data," RSS Workshop on RGB-D Cameras, 2011.
Zhou et al., "RML Glove—An Exoskelton Glove Mechanism for Mobile Robot Navigation through Haptics Feedback," IEEE/ASME Transactions on Mechatronics, Apr. 2015, pp. 641-652, vol. 20, No. 2.
Adamson et al., "Approximating and Intersecting Surfaces from Points," Proceedings of the 2003 Eurographics/ACM SIGGRAPH Symposium on Geometry Processing (SGP '03), Jun. 2003, pp. 230-239.
Hua et al., "A 2-D Microdisplay Using an Integrated Microresonating Waveguide Scanning System," 20th International Conference on Adaptive Structures and Technologies, Hong Kong, Oct. 2009, pp. 53-62.
Inglese et al., "A Human-Scale Virtual Environment with Haptic Feedback," Proc. ICINCO, 2005, pp. 140-145, vol. 4.
International Bureau, International Report on Patentability dated Jan. 3, 2014, issued in connection with International Application No. PCT/US2012/042716, filed on Jun. 12, 2012, 9 pages.
International Searching Authority, International Search Report and Written Opinion dated Dec. 11, 2015, issued in connection with International Application No. PCT/US2015/049781, filed on Sep. 11, 2015, 14 pages.
Klein et al., "Point Cloud Collision Detection," Eurographics, Sep. 2004, pp. 567-576, vol. 23, No. 3.
Lee et al., "Haptic Rendering of Point Set Surfaces," Second Joint EuroHaptics Conference and Symposium on Haptic Interfaces for Virtual Environment and Teleoperator Systems (WHC'07), IEEE, 2007, pp. 513-518.
Levin, David, "The Approximation Power of Moving Least-Squares," Mathematics of Computation, Oct. 1998, pp. 1517-1531, vol. 67, No. 224.
Zhou, Ma et al., An Exoskeleton Glove Mechanism for Mobile Robot Navigation through Haptics Feedback, IEEE/ASME Transactions on Mechatronics (2013).
Diolaiti, Nicola et al., Haptic Teleoperation of a Mobile Robot, IFAC Symp. on Robot Control 2798-805 (2003).
Buss, Martin et al., Multi-Modal Multi-User Telepresence and Teleaction System, IEEE/RSJ Int'l Conf. on Intelligent Robots and Sys. 4137-38 (Sep. 2008).
Johnson and P. Willemsen, "Six degree-of-freedom haptic rendering of complex polygonal models," in Haptic Interfaces for Virtual Environment and Teleoperator Systems, 2003. HAPTICS 2003. Proceedings. 11th Symposium on. IEEE, 2003, pp. 229-235.
Otaduy and M. Lin, "Introduction to haptic rendering," in ACM SIGGRAPH 2005 Courses. ACM, 2005, p. 3.
Johnson, P. Willemsen, and E. Cohen, "Six degree-of-freedom haptic rendering using spatialized normal cone search," Visualization and Computer Graphics, IEEE Transactions on, vol. 11, No. 6, pp. 661-670, 2005.
Nelson, D. Johnson, and E. Cohen, "Haptic rendering of surface-to-surface sculpted model interaction," in ACM SIGGRAPH 2005 Courses. ACM, 2005, p. 97.
Colgate, M. Stanley, and J. Brown, "Issues in the haptic display of tool use," in Intelligent Robots and Systems 95.'Human Robot Interaction and Cooperative Robots', Proceedings. 1995 IEEE/RSJ International Conference on, vol. 3. IEEE, 1995, pp. 140-145.
Zilles and J. Salisbury, "A constraint-based god-object method for haptic display," in Intelligent Robots and Systems 95.'Human Robot Interaction and Cooperative Robots', Proceedings. 1995 IEEE/RSJ International Conference on, vol. 3. IEEE, 1995, pp. 146-151.
Baraff, "Analytical methods for dynamic simulation of nonpenetrating rigid bodies," in ACM SIGGRAPH Computer Graphics, vol. 23, No. 3. ACM, 1989, pp. 223-232.
Ruspini and O. Khatib, "Collision/contact models for the dynamic simulation of complex environments," in Proc. IEEE/IRSJ Int. Conf. on Intelligent Robots and Systems, vol. 82. Citeseer, 1997.
Redon, A. Kheddar, and S. Coquillart, "Gauss' least constraints principle and rigid body simulations," in Robotics and Automation, 2002. Proceedings. ICRA'02. IEEE International Conference on, vol. 1. IEEE, 2002, pp. 517-522.
McNeely, K. Puterbaugh, and J. Troy, "Six degree-of-freedom haptic rendering using voxel sampling," in Proceedings of the 26th annual conference on Computer graphics and interactive techniques. ACM Press/Addison-Wesley Publishing Co., 1999, pp. 401-408.
Gregory, A. Mascarenhas, S. Ehmann, M. Lin, and D. Manocha, "Six degree-of-freedom haptic display of polygonal models," in Proceedings of the conference on Visualization'00. IEEE Computer Society Press, 2000, pp. 139-146.
Wan and W. McNeely, "Quasi-static approximation for 6 degrees-of-freedom haptic rendering," in Proceedings of the 14th IEEE Visualization 2003 (VIS'03). IEEE Computer Society, 2003, p. 34.
Hasegawa and M. Sato, "Real-time rigid body simulation for haptic interactions based on contact volume of polygonal objects," in Computer Graphics Forum, vol. 23, No. 3. Wiley Online Library, 2004, pp. 529-538.
Otaduy and M. Lin, "Sensation preserving simplification for haptic rendering," in ACM SIGGRAPH 2005 Courses. 2005, p. 72.
Otaduy, et al., "A modular haptic rendering algorithm for stable and transparent 6-dof manipulation," Robotics, IEEE Transactions on, vol. 22, No. 4, pp. 751-762, 2006.
McNeely, K. Puterbaugh, and J. Troy, "Voxel-based 6-dof haptic rendering improvements," Haptics-e, vol. 3, No. 7, 2006.
Barbic and D. James, "Time-critical distributed contact for 6-dof haptic rendering of adaptively sampled reduced deformable models," 2007.
Kolesnikov and M. Zefran, "Energy-based 6-dof penetration depth computation for penalty-based haptic rendering algorithms," in Intelligent Robots and Systems, 2007. IROS 2007. IEEE/RSJ International Conference on. IEEE, 2007, pp. 2120-2125.
Barbic and D. James, "Six-dof haptic rendering of contact between geometrically complex reduced deformable models," Haptics, IEEE Transactions on, vol. 1, No. 1, pp. 39-52, 2008.
He and Y. Chen, "Six-degree-of-freedom haptic rendering in virtual teleoperation," Instrumentation and Measurement, IEEE Transactions on, vol. 57, No. 9, pp. 1866-1875, 2008.
Mirtich and J. Canny, "Impulse-based simulation of rigid bodies," in Proceedings of the 1995 symposium on Interactive 3D graphics. ACM, 1995, pp. 181-ff.
Chang and J. Colgate, "Real-time impulse-based simulation of rigid body systems for haptic display," in Proc. Symp. on Interactive 3D Graphics, 1997, pp. 200-209.
Constantinescu, S. Salcudean, and E. Croft, "Haptic rendering of rigid body collisions," in Haptic Interfaces for Virtual Environment and Teleoperator Systems, 2004. HAPTICS'04. Proceedings. 12th International Conference on. IEEE, 2004, pp. 2-8.
Constantinescu, "Haptic rendering of rigid contacts using impulsive and penalty forces," Robotics, IEEE Transactions on, vol. 21, No. 3, pp. 309-323, 2005.
Ruffaldi, D. Morris, F. Barbagli, K. Salisbury, and M. Bergamasco, "Voxel-based haptic rendering using implicit sphere trees," in Haptic interfaces for virtual environment and teleoperator systems, 2008. haptics 2008. symposium on. IEEE, 2008, pp. 319-325.
Berkelman, R. Hollis, and D. Baraff, "Interaction with a real time dynamic environment simulation using a magnetic levitation haptic interface device," in Robotics and Automation, 1999. Proceedings. 1999 IEEE International Conference on, vol. 4. IEEE, 1999, pp. 3261-3266.
Ortega, S. Redon, and S. Coquillart, "A six degree-of-freedom god-object method for haptic display of rigid bodies," in Virtual Reality Conference, 2006. IEEE, 2006, pp. 191-198.

(56) References Cited

OTHER PUBLICATIONS

Ortega, et al., "A six degree-of-freedom god-object method for haptic display of rigid bodies with surface properties," Visualization and Computer Graphics, IEEE Transactions on, vol. 13, No. 3, pp. 458-469, 2007.
Chan, F. Conti, N. Blevins, and K. Salisbury, "Constraint-based six degree-of-freedom haptic rendering of volume-embedded isosurfaces," in Proc. Of the 2011 IEEE International World Haptics Conference, 2011.
Zhang, D. Wang, Y. Zhang, and J. Xiao, "Configuration-based optimization for six degree-of-freedom haptic rendering using spheretrees," in Intelligent Robots and Systems (IROS), 2011 IEEE/RSJ International Conference on. IEEE, 2011, pp. 2602-2607.
Wang, X. Zhang, Y. Zhang, and J. Xiao, "Configuration-based optimization for six degree-of-freedom haptic rendering for fine manipulation," in Robotics and Automation (ICRA), 2011 IEEE International Conference on. IEEE, 2011, pp. 906-912.
Wang, S. Liu, X Zhang, Y. Zhang, and J. Xiao, "Six-degree-of-freedom haptic simulation of organ deformation in dental operations," in Robotics and Automation (ICRA), 2012 IEEE International Conference on. IEEE, 2012, pp. 1050-1056.
Leeper, S. Chan, and K. Salisbury, "Point clouds can be represented as implicit surfaces for constraint-based haptic rendering," in Robotics and Automations (ICRA), 2012, IEEE International Conference on. IEEE, 2012, pp. 5000-5005.
Rasool and A. Sourin, "Haptic interaction with 2d images," in Proceedings of the 10th International Conference on Virtual Reality Continuum and Its Applications in Industry. ACM, 2011, pp. 13-22.
Payandeh and Z. Stanisic, "On application of virtual fixtures as an aid for telemanipulation and training," in Haptic Interfaces for Virtual Environment and Teleoperator Systems, 2002. HAPTICS 2002. Proceedings. 10th Symposium on, 2002, pp. 18-23.
Ryden and H. Chizeck, "Forbidden-region virtual fixtures from streaming point clouds: Remotely touching and protecting a beating heart," in Intelligent Robots and Systems (IROS), 2012 IEEE/RSJ International Conference on. IEEE, 2012.
Leeper, S. Chan, K. Hsiao, M. Ciocarlie, and K. Salisbury, "Constraint-based haptic rendering of point data for teleoperated robot grasping," in Haptics Symposium (HAPTICS), 2012 IEEE, Mar. 2012, pp. 377-383.
Tomasi and R. Manduchi, "Bilateral filtering for gray and color images," in Computer Vision, 1998. Sixth International conference on. IEEE, 1998, pp. 839-846.
Wendland, "Piecewise polynomial, positive definite and compactly supported radial functions of minimal degree," Advances in computational Mathematics, vol. 4, No. 1, pp. 389-396, 1995.
Wilhelmsen, "A nearest point algorithm," Mathematics of computation, vol. 30, no. 133, pp. 48-57, 1976.
Adams and B. Hannaford, "Stable haptic interaction with virtual environments," Robotics and Automation, IEEE Transactions on, vol. 15, No. 3, pp. 465-474, 1999.
N. Diolaiti, G. Niemeyer, F. Barbagli, and J. Salisbury, "Stability of haptic rendering: Discretization, quantization, time delay, and coulomb effects," Robotics, IEEE Transactions on, vol. 22, No. 2, pp. 256-268, 2006.
Kolesnikov and M. Zefran, "Generalized penetration depth for penalty-based six-degree-of-freedom haptic rendering," Robotica, vol. 26, No. 04, pp. 513-524, 2008.
Rosenberg, "Virtual fixtures: Perceptual tools for telerobotic manipulation," pp. 76-82, Sep. 1993.
Kitagawa, D. Dokko, A. Okamura, and D. Yuh, "Effect of sensorysubstitution on suturemanipulation forces for robotic surgical systems," Journal of Thoracic and Cardiovascular Surgery, vol. 129, No. 1, pp. 151-158, 2005.
Navkar, Z. Deng, D. J. Shah, K. E. Bekris, and N. V. Tsekos, "Visual and force-feedback guidance for robot-assisted interventions in the beating heart with real-time MRI," pp. 689-694, May 2012.
International Search Report for PCT/US2015/18320, dated Jun. 18, 2105.
Lloyd, et al., "Programming contact tasks using a reality-based virtual environment integrated with vision," IEEE transactions on robotics and automation, Sep. 1997.

* cited by examiner

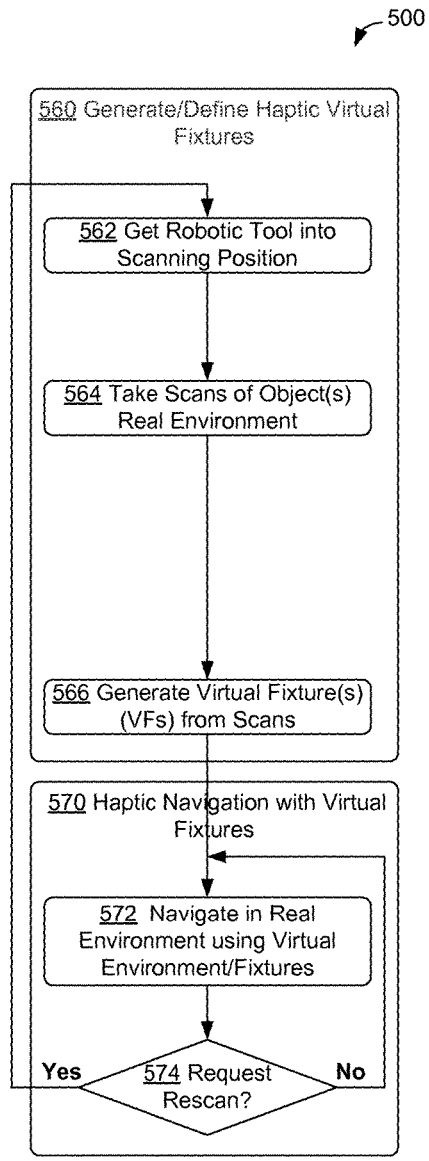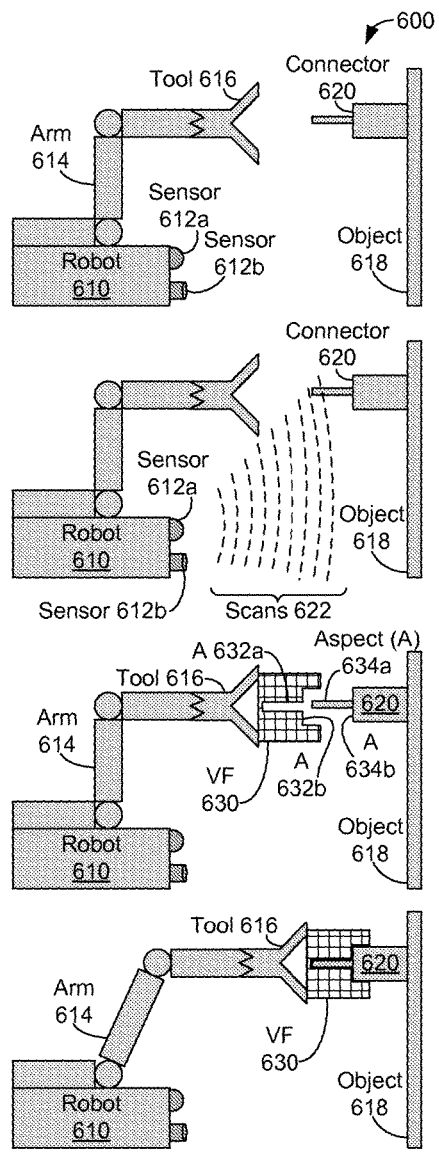
FIG. 5B
FIG. 6A

HAPTIC VIRTUAL FIXTURE TOOLS

CROSS-REFERENCE TO RELATED APPLICATIONS

The present application claims priority to U.S. Provisional Patent Application No. 61/947,181 entitled "Virtual Haptic Fixture Tools", filed Mar. 3, 2014, which is entirely incorporated by reference herein for all purposes.

STATEMENT OF GOVERNMENT RIGHTS

This invention was made with government support under grant number W912HQ-12-P-0117 awarded by the Department of Defense. The government has certain rights in the invention.

BACKGROUND OF THE INVENTION

Unless otherwise indicated herein, the materials described in this section are not prior art to the claims in this application and are not admitted to be prior art by inclusion in this section.

Haptic rendering is the translation of forces in a virtual environment to a physical device that can provide touch-based, a.k.a. haptic, feedback to a user of the haptic rendering device. Both impedance type and admittance type haptic rendering devices are available.

To provide haptic feedback about the virtual environment, objects in the virtual environment are often represented as a collection of polygons, such as triangles, that can be operated upon using a haptic rendering device. The haptic rendering device can be controlled using a "Haptic Interaction Point" (HIP) in the virtual environment, which performs a similar function for the haptic rendering device as a mouse pointer does for a computer mouse. Ideally, the HIP should not be able to penetrate virtual environment objects.

Techniques for six degree-of-freedom (6-DOF) haptic rendering in virtual environments consisting of polygons and/or voxels (volume pixels) have been specified. These efforts are typically divided into direct rendering- and virtual coupling methods where the latter can further be subdivided into penalty-, impulse- and constraint-based methods. The simplest 6-DOF haptic rendering method is the direct method, where the virtual tool perfectly matches the configuration of the haptic rendering device. The force sent to user is directly based on the amount of penetration in the virtual environment. Unfortunately the direct method suffers from problems with "pop through". Pop through is an artifact that arises when the rendering algorithm erroneously penetrates a thin surface.

In virtual coupling methods, a virtual coupling, or connection, between the haptic rendering device and the virtual tool is utilized. In this method, the force on the haptic rendering device is simply calculated as a spring between the virtual tool, referred to also as 'god-object', 'proxy' or 'IHIP', and the configuration of the haptic rendering device. 6-DOF rendering methods using virtual couplings rely on rigid body simulations, since the virtual tool has to be simulated as a 6-DOF object, as compared to three degree-of-freedom (3-DOF) rendering where the rotational component can be ignored. In penalty-based methods, the configuration (position and rotation) of the virtual tool is calculated using penalty forces based on the tool's penetration depth into objects, similar to how penalty-costs are used in traditional optimization. These penalty forces are then integrated to produce the motion of the virtual tool. This method results in a virtual tool that actually penetrates objects in the environment. Fortunately this penetration is typically very small.

For impulse-based dynamics methods, a virtual object is moved by a series of impulses upon contact/collision (rather than forces based on penetration depth). In constraint-based methods, the virtual tool moves into contact with the environment but (ideally) never violates constraints imposed by the environment.

Many environments can be explored by robots, such as undersea, outer space, and hazardous environments. In some of these environments, robots can be controlled by human operators receiving video and/or audio information from the robot.

SUMMARY

In one aspect, a method is provided. A computing device determines a particular real-world object within a real-world environment that also includes a robotic tool. The computing device receives a specification of the particular real-world object. The computing device determines a corresponding virtual fixture that corresponds to the particular real-world object based on the specification of the particular real-world object. One or more corresponding aspects of the corresponding virtual fixture are configured to align with one or more aspects of the particular real-world object. The computing device provides a virtual environment that is configured for manipulating the robotic tool to operate on the particular real-world object by utilizing the corresponding virtual fixture. The corresponding virtual fixture is configured to provide haptic feedback based on a position of a virtual robotic tool in the virtual environment. The virtual robotic tool in the virtual environment corresponds to the robotic tool in the real-world environment.

In another aspect, a computing device is provided. The computing device includes a processor and data storage. The data storage stores instructions that, upon execution by the processor, cause the computing device to perform functions. The functions include: determining a particular real-world object within a real-world environment that also includes a robotic tool; receiving a specification of the particular real-world object; determining a corresponding virtual fixture that corresponds to the particular real-world object based on the specification of the particular real-world object, where one or more corresponding aspects of the corresponding virtual fixture are configured to align with one or more aspects of the particular real-world object; and providing a virtual environment that is configured for manipulating the robotic tool to operate on the particular real-world object by utilizing the corresponding virtual fixture, where the corresponding virtual fixture is configured to provide haptic feedback, based on a position of a virtual robotic tool in the virtual environment, and where the virtual robotic tool in the virtual environment corresponds to the robotic tool in the real-world environment.

In another aspect, an article of manufacture is provided. The article of manufacture includes a physical and/or non-transitory computer-readable storage medium storing instructions that, upon execution by a processor of a computing device, cause the computing device to perform functions. The functions include: determining a particular real-world object within a real-world environment that also includes a robotic tool; receiving a specification of the particular real-world object; determining a corresponding virtual fixture that corresponds to the particular real-world object based on the specification of the particular real-world object, where one or more corresponding aspects of the corresponding virtual fixture are configured to align with one or more aspects of the particular real-world object; and providing a virtual environment that is configured for manipulating the robotic tool to operate on the particular real-world object by utilizing the corresponding virtual fixture, where the corresponding virtual fixture is configured to provide haptic feedback, based on a position of a virtual robotic tool in the virtual environment, and where the virtual robotic tool in the virtual environment corresponds to the robotic tool in the real-world environment.

One advantage of this application is the ability to specify and providing haptic feedback for application using virtual fixtures. The virtual fixtures can be defined based on objects recognized in the environment, including objects controlled by human operators (or other entities). That is, as an object changes within the environment, a virtual fixture associated with the object can dynamically adjust to the changes of the object. If the object is a controlled object under the control of a human operator, haptic feedback provided by the virtual fixture can guide the interaction of the controlled object with other objects in the environment.

Another advantage is that virtual fixtures can be dynamically changed based on status of operations, such tasks listed and organized on a task list. One or more virtual fixtures can be associated with task(s) on the task list. Virtual fixtures associated with a task can change based on the status of the task—for example, haptic feedback from a virtual fixture can change based on alignment between the virtual fixture and one or more objects in the environment. Thus, the virtual fixtures can change throughout execution of a task, and so guide completion of the task. Further, a level of automation can be specified that controls the virtual fixtures, and so allows for full automation, partial automation, or no automation (manual control) for completing the task.

Providing haptic feedback from underwater sensors to an operator at the surface has the potential to transform manipulation capability of robotic tools, particularly robotic tools utilized in challenging environments (e.g., subsea environments, outer space environments, toxic environments, and extreme temperature environments). Virtual fixtures will allow manipulators to precisely maneuver in sensitive environments where contact should not be made with surrounding objects or structures. Biological studies of animal colonies around underwater hydrothermal vents could benefit greatly from such a capability—allowing scientists to carefully gather data with unprecedented resolution and proximity to sensitive organisms. Common tasks such as connector mating between instruments can be carried out very efficiently by creating guidance fixture near male and female connectors. Thus, time, expense, and equipment can be saved, and the environment preserved using the herein-described haptic feedback techniques to perform tasks utilized in challenging environments.

BRIEF DESCRIPTION OF THE DRAWINGS

Various examples of particular embodiments are described herein with reference to the following drawings, wherein like numerals denote like entities, in which:

FIG. 5B is a flow chart of an embodiment of the method shown in FIG. 5A related to generating virtual fixtures based on scans of an environment, in accordance with an example embodiment;

FIGS. 6A and 6B depict a scenario related to the method depicted in FIGS. 5A and 5B, in accordance with an example embodiment;

DETAILED DESCRIPTION

Overview

Figure 1:
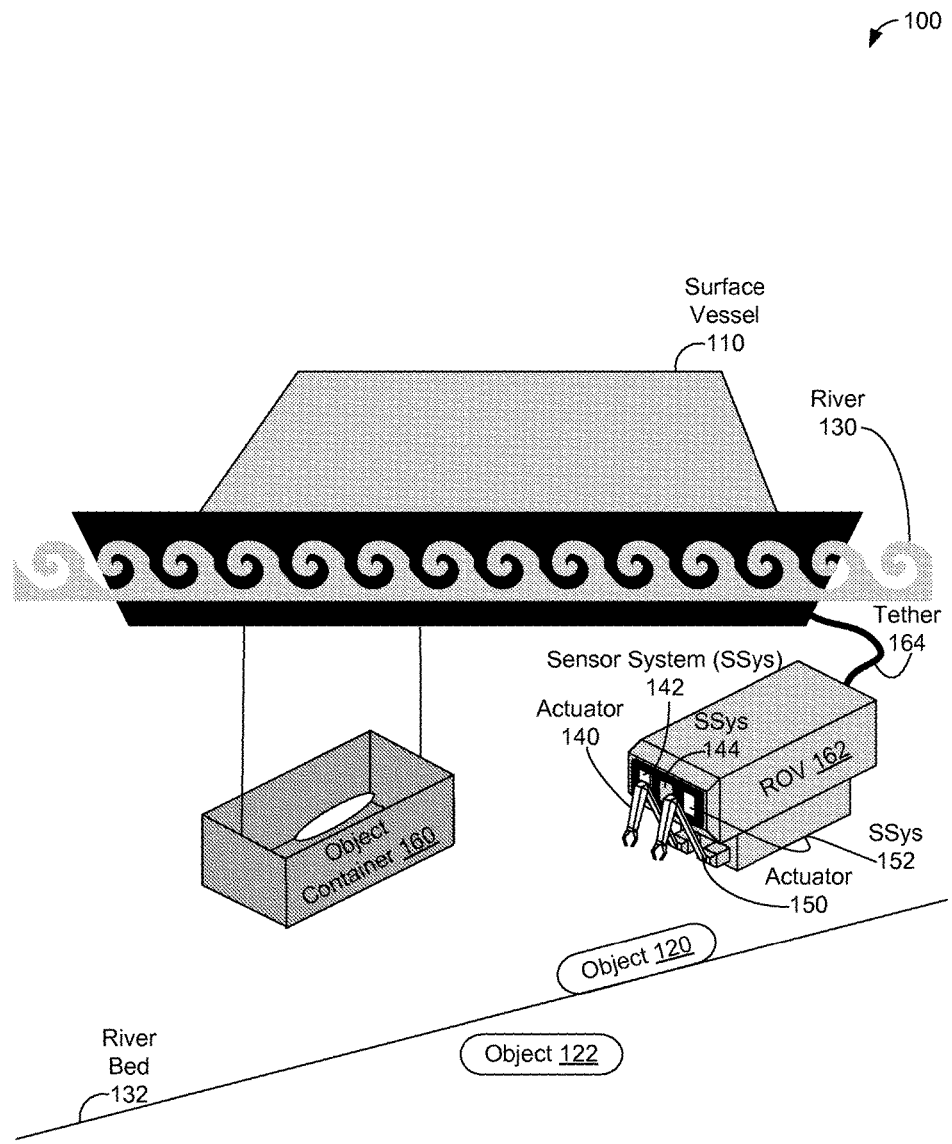
FIG. 1 illustrates a scenario where a vessel detects and retrieves an underwater object, in accordance with an example embodiment.

Herein are described techniques related to haptic navigation of remotely-operated equipment. Haptic navigation can be used to aid human operators while working with remotely-operated equipment to solve co-robotic and telerobotic tasks. Many complex tasks require high precision and repetitive actions for which automated systems are highly skilled. However, performing these complex tasks can also require critical judgment and decision-making, which is best done by a human operator. Thus, herein is described a co-robotic manipulator system (human+automation) for haptic navigation that affords the operator a great amount of freedom but also enhances performance via computer-generated auditory, visual, and haptic feedback.

Haptic navigation can improve speed, safety, and accuracy of a remotely operated vehicle (ROV) and/or other robotic tool(s) manipulation by incorporating intuitive and responsive force feedback into operator controls. Haptic navigation can be based on fused sensor data to provide an accurate, concise, and timely display of information from a remote environment, such as an undersea environment. The sensor data can be provided by a number of sensors, including but not limited to, range sensors, video cameras, still cameras, depth cameras, actuators, and other sensors and actuators. A control system using haptic navigation can give an operator an intuitive interface with haptic feedback enabling the operator to readily control the ROV and/or robotic tools. The resulting technology can help prevent mistakes and increase efficiency in manipulation tasks. Rather than using the feedback to solve the task (by forcing the human operator along a pre-defined trajectory), haptic navigation use the feedback to communicate "intent" of the computer system during sequential operations A haptic force feedback loop can be utilized by local computing devices resident with (or close to) the operator. The local computing devices can also generate operator displays—running the force feedback loop on such local computing devices can effectively eliminate delay in receiving feedback from a remote manipulator. Force feedback can aid an operator in positioning manipulators and tools. In some embodiments, the force feedback can be based on range sensing.

In an example use of haptic navigation and sensor fusion, a manipulator (or other actuator(s) of an ROV) can be controlled by a haptic device that senses position and can exert force on an operator's hand. The operator can look at the actual manipulator task space, either as a full 3D model or on a regular video display. Haptic and other feedback to the operator can be related to "virtual fixtures" added to the virtual environment. The virtual fixtures can provide haptic (and other) feedback to aid operation of robotic devices in a remote environment, such as an operator performing tasks such as remote search and rescue, sensor placement, ordnance placement/removal, remote movement of materiel, and remote construction.

Such virtual fixtures can be overlaid on top of this task space. Continuing the example above, a virtual fixture can be virtually anchored to a gripper of the manipulator such that the operator can move both the virtual fixture and the manipulator simultaneously. In general, virtual fixtures can be arbitrary in both appearance and feedback; e.g., an operator can be notified about virtual fixtures using any combination of visual, auditory, and haptic feedback. For instance, the haptic feedback can take the form of repelling force feedback, vibrotactile feedback, or rendered as a viscous resistance. In some scenarios, virtual fixtures can act as one or more virtual rulers guiding a remote manipulator along a pre-defined path. The operator can be notified of deviations from the path defined by the virtual fixture using audio, visual or haptic feedback in particular. Haptic feedback (force feedback applied to the operator control stick) can be used to guide the operator (and hence the remote end effector) back to the desired path.

Haptic (and other) feedback can be rendered with respect to the shape of the virtual fixture and the geometries of the task space as captured in real-time by a range sensor and/or other sensors. To the operator, the virtual fixtures can provide haptic feedback that feels like aligning the fixture to the subsea equipment. With haptic navigation, the operator can align the tool in front of the equipment before touching and potentially damaging equipment in the environment. Haptic navigation can also be used when part or the entire environment is motion; e.g., when subsea equipment is moving, when the ROV is flying. A virtual fixture best suited for the task at hand can be either chosen directly by the operator (e.g., selected from a toolbox of virtual fixtures, perhaps via a computerized search for a particular virtual fixture or via a human inspection of virtual fixtures in the toolbox) and/or suggested by the computer system according to a procedural plan.

Example virtual fixtures include guidance fixtures, forbidden region fixtures and combination fixtures. Guidance fixtures can be used to instruct a human operator (or other entity) to direct a manipulator toward a desired location or region of the virtual environment. Forbidden region fixtures can be used to instruct the operator (or other entity) to direct a manipulator to avoid collision with one or more objects of the virtual environment. Combination fixtures can be used to instruct the operator (or other entity) to direct a manipulator based on where a manipulator is with respect to the environment and/or with respect to one or more objects.

Sensor fusion techniques can merge sensor data into a common 3D model of an environment that can be updated in real-time, where the common 3D model can be part of a virtual environment that contains virtual fixtures. The operator can view the common 3D model from an arbitrary perspective, allowing simultaneous views of the environment from the operator's perspective, from the perspective of an object in the environment, and/or from one or more perspectives of choice. Further, the common 3D model can include data other than the sensor data; e.g., data from a pre-planned simulation and/or the virtual fixtures. In this example, the operator could see the simulated task overlaid upon a view of the actual workspace in real-time.

Haptic navigation can reduce the inherent risk of remote operation of robotic tools, such as using robotic tools in challenging environments, such as underwater, outer space, toxic, extreme temperature, and other environments. Example exploration devices include undersea and outer space exploration vehicles, explosive location devices, chemical sniffing (e.g., drugs, gas leaks, toxic waste) mechanisms, exploration robots, and/or other exploration devices. This risk can be reduced by ensuring that work can be executed according to plan, as well as according to simulation. For example, using haptic navigation, including haptic feedback in forbidden regions, can provide additional information about an environment under exploration and/or protect the exploration device from entering a known dangerous, already-explored, or otherwise forbidden region. Haptic navigation can reduce the cost involved with custom tooling as custom tools can be less robust if collisions are eliminated. Haptic navigation can, in combination with a dynamic visualization of the workspace, give the operator unprecedented control of the manipulator. It will reduce the time currently spent on training and increase the productivity. Haptic navigation can improve performance of semi-autonomous systems by combining the skill, cognition and experience of the human operator with the accuracy, repeatability and speed of a computer system, and so enabling new manipulation tasks.

Scenarios Utilizing Haptic Rendering and Navigation

Virtual tools, haptic interaction sessions, and the herein-described techniques can be applied to underwater applications. For example, an underwater depth-enabled camera, similar to the Microsoft Xbox Kinect but adapted for underwater activities, can be used for locating objects underwater and providing data for 6-DOF haptic feedback to a human operator of a robotic tool and/o an ROV. The haptic feedback can provide a human operator with a sense of touch for objects seen by the camera. As another example, separate sensors, such as range sensors providing distance information and video and/or still cameras providing image information, can be used instead of, or along with, depth-enabled cameras.

This system can: (a) permit the operator to 'feel' objects, such as underwater ordnance during remediation or objects being salvaged, through a haptic 6-DOF interface, based upon the camera system image and dynamic haptic rendering, (b) enable the operator to guide the robot end-effectors with the target during removal, via remote-operation, and (c) establish virtual fixtures around protected zones of objects (such as locations that might result in undesirable outcomes, such as explosions). If the operator tries to move an end-effector too close to a protected zone, he/she will feel resistance as the haptic interface "pushes back". Imposition of protected zones, e.g., using virtual fixtures, can prevent robot end effector contact with undesirable locations, either in the environment or on the ordnance. The end effector of a robot can be a device at an end of a robot arm or other appendage; e.g., a robotic hand at the end of robot arm.

Combined with a remotely-operated ROV and/or robotic tool, this will allow human directed robotic capture and removal of objects in a variety of environments; e.g., environments under fresh or salt water.

FIG. 1 illustrates a scenario 100 where surface vessel 110 detects and retrieves underwater objects 120, 122 using ROV 162, in accordance with an example embodiment. In scenario 100, surface vessel 110 is floating in river 130 above river bed 132. In other scenarios, surface vessel 110 can be used in an ocean, lake, pond, or other water environment than river 130.

In scenario 100, ROV 162 includes robotic arms and hands acting as actuators 140 and 150 and sensor systems (SSys) 142, 144, and 152. In other scenarios, ROV 162 can have more, fewer, and/or different actuators than actuators 140, 150 and/or more, fewer, and/or different sensor systems than sensor systems 142, 144, 152. In even other scenarios, more, fewer, and/or different ROVs than ROV 162 can be utilized. In still other scenarios, surface vessel 110 can have actuators and/or sensor systems.

Each actuator 140, 150 can be partially or completely controlled by a remote operator; e.g., a human operator aboard surface vessel 110 or located in another (remote) location. In some scenarios, a remote operator can adjust a level of automation of actuator 140 and/or 150; e.g., to be manually operated, semi-autonomously operated, or fully autonomous operated. The remote operator can receive feedback about the operation of actuator(s) 140, 150 and/or about the environment using sensor system(s) 142, 144, 152. Sensor system(s) 142, 144, 152 can include one or more range sensors, cameras, laser scanning/line-scanning systems, sonar systems, depth-enabled cameras including visible-light camera(s) and near-infrared camera(s), metal detectors/metal detection systems, and light sources including visible-light light source(s) and near-infrared light source(s), perhaps configured to emit pseudo-random patterns of light. In particular, sensor system(s) 142, 144, 152 can be configured to provide range measurements, where the range measurements can be used to generate haptic feedback for three or more degrees of freedom in controlling actuator(s) 140, 150.

In scenario 100, the remote operator of actuators 140, 150 operates actuators 140, 150 in accord with a task list, where the task list is configured to control virtual fixtures associated with tasks of retrieving object 120 from river bed 132 and object 122 from under river bed 132. Once an object is retrieved, the object can be placed in object container 160; e.g., using a guidance fixture associated with the task list configured to guide actuator 140 (and/or 150) from a location of the object to a location of object container 160. Other virtual fixtures, such as but not limited to forbidden-region fixtures, can be associated with the task list. In other scenarios, virtual fixtures can be generated based on scans of sensor systems 142, 144, 152 and/or chosen directly by the operator (e.g., selected from a toolbox of virtual fixtures, perhaps by search or inspection of virtual fixtures in the toolbox).

In scenario 100, another remote operator can use remotely-operated vehicle 162 to provide additional information regarding the environment including objects 120, 122, actuators 140, 150, river bed 132, and/or river 130. Remotely-operated vehicle 162 can be attached to surface vessel 110 via tether 164. Tether 164 can include power and/or communication cables to enable remotely-operated vehicle 162 to be powered from and/or communicate with surface vessel 110. In other embodiments, remotely-operated vehicle 162 can operate without tether 164.

Figure 2:
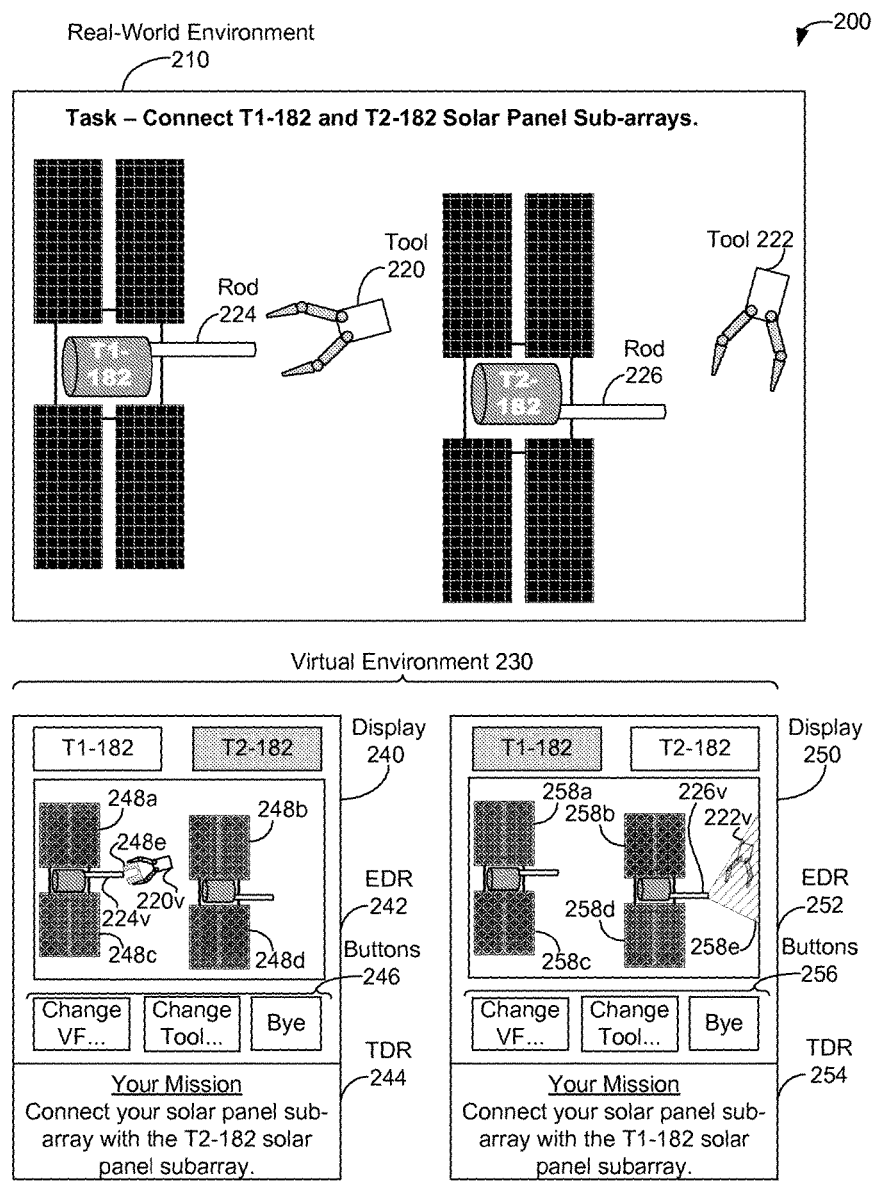
FIG. 2 depicts a construction scenario with real-world and virtual environments, in accordance with an example embodiment.

FIG. 2 depicts a construction scenario with real-world environment 210 and virtual environment 230, in accordance with an example embodiment. In some embodiments, real-world environment 210 can represent an extra-terrestrial environment; e.g., in space or on a planet other than Earth. In these embodiments, values of various parameters, such as the speed of gravity (if any), planetary tilt, and relative location of other celestial bodies, can change from Earth-normal values.

In scenario 200, a solar power array in real-world environment 210 is being constructed from at least two depicted sub-arrays: sub-array T1-182, shown on the left side of real-world environment 210, and sub-array T2-182, shown on the right side of real-world environment 210. To construct the solar power array, sub-array T1-182 is being moved by tool 220 by way of rod 224 and sub-array T2-182 is being moved by tool 224 by way of rod 226. In other scenarios, more or fewer tools can be utilized in real-world environment 210 and/or other operations can occur in real-world environment 210.

In scenario 200, virtual environment 230 is used to monitor and control tools 220, 222 in real-world environment 210 using haptic navigation techniques. As shown in FIG. 2, virtual environment 230 includes displays 240 and 250. In scenario 200, display 240 and an associated haptic controller (controller not shown in FIG. 2) are used to monitor and control tool 220 via haptic navigation. Similarly, display 250 and another associated haptic controller (controller not shown in FIG. 2) are used to monitor and control tool 222 via haptic navigation for scenario 200.

Display 240 includes environmental-display region (EDR) 242 and textual-display region (TDR) 244. Environmental-display region 242 includes a display of sub-arrays T1-182 and T2-182 including virtual rod 224v representing rod 224 of sub-array T1-182, virtual tool 220v representing tool 220, virtual fixtures 248a, 248b, 248c, 248d, 248e, and control buttons 2556. Virtual tool 220v, and subsequently tool 220, can be controlled by use of a 6-DOF (or other) haptic interface to enable control over location and rotation of virtual tool 220v and to receive force feedback related to related to the virtual tool using the herein-described haptic navigation techniques. Textual-display region 244 can provide text and perhaps other types of information (e.g., images, sounds, sensor information, communication sessions, etc.) for use as part of display 240.

Regarding environmental-display region 242, five virtual fixtures 248a, 248b, 248c, 248d, 248e are shown in as part of display 240 of virtual environment 230. In scenario 200, virtual fixtures 248a-248d are forbidden region fixtures protecting solar panels of the T1-182 and T2-182 sub-arrays. Virtual fixture 248e is a combined fixture shown attached to virtual tool 220v in FIG. 2.

Combined fixture 248e allows an operator of virtual tool 220v to control virtual tool 220v freely until virtual tool 220v is in at least partial alignment with virtual rod 224v in virtual environment 230 (and therefore tool 220 would be in at least partial alignment with rod 224 in real-world environment 210). Once partial alignment is reached, combined fixture 248e can inhibit movement(s) of virtual tool 220v that would take virtual tool 220v out of alignment with virtual rod 224v via while allowing movement(s) that would bring virtual tool 220v into closer alignment with virtual rod 224v.

In scenario 200, combined fixture 248e is used to enforce partial/complete alignment conditions between virtual tool 220v and virtual rod 224v until either: (a) virtual tool 220v has completed a task associated with virtual rod 224v, at which point virtual fixture 248e can be considered to have served its purpose in scenario 200 and perhaps deactivated, or (b) virtual tool 220v disengages from virtual rod 224v thereby postponing or perhaps stopping the task where virtual tool 220v is associated with virtual rod 224v. In other scenarios, more, fewer, and/or different criteria can be used by combined fixtures to start/stop enforcement of alignment conditions between objects in virtual environments.

Regarding control buttons 246 of environment-display region 242, the "Change VF" control button can enable changing, creation, and/or deletion of one or more virtual fixtures. The virtual fixture(s) can be changed, created, and/or deleted via selection from a virtual toolbox of a virtual fixture, via generation of a new virtual fixture based on scan(s) of real-world environment 210, via operator commands/user interface operations (e.g., entering a "Delete virtual fixture" command; clicking on a "Create new virtual fixture" button), and/or via other techniques. The "Change Tool" button enables changing display 240 to monitor/control to a different virtual tool and/or to change operation of tool 220; e.g., changing use of a robot hand as part of tool 220 as shown in FIG. 2. And, the "Bye" control button can be used to end the haptic navigation session with tool 220/virtual tool 220v. More, fewer and/or different control buttons than control buttons 246 can be utilized in other scenarios.

In other scenarios, display 240 can be used to monitor and control multiple haptic navigation sessions: for example, a robot arm can have three virtual tools corresponding to a shoulder, an elbow, and a wrist, with each virtual tool having up to 6-DOF. Then, if display 240 were used to control the robot arm, display 240 can control haptic navigation sessions for each of the virtual tools. As another example, a tool can have multiple controllable components (e.g., robot arms, robot hands, an engine/propulsion system), where some or all of the controllable components can be directed using haptic navigation session(s). Then, if display 240 were used to monitor and control such a tool, display 240 can control one or more haptic navigation sessions with the tool. Many other examples are possible as well.

Display 250 performs a similar function with respect to tool 222 as display 240 does for tool 220. In particular, display 250 includes environmental-display region 252 and textual-display region 254, which is similar to textual-display region 242 of display 240. Environmental-display region 252 includes a display of sub-arrays T1-182 and T2-182 including virtual rod 226v representing rod 226 of sub-array T2-182, virtual tool 222v representing tool 222, virtual fixtures 258a, 258b, 258c, 258d, 258e, and control buttons 246. Virtual tool 222v, and subsequently tool 222, can be controlled by use of a 6-DOF (or other) haptic interface such as discussed above in the context of virtual tool 220v of display 240 and tool 220.

In scenario 200, virtual fixtures 258a-258d are forbidden region fixtures protecting solar panels of the T1-182 and T2-182 sub-arrays; i.e., virtual fixtures 258a-258d perform similar functions in the context of display 250 of virtual environment 230 as respective virtual fixtures 248a-248d perform for display 240 of virtual environment 230. Further, virtual fixture 258e is a guidance fixture configured to guide virtual tool 222v to a desired location at an end of virtual rod 226v. Guidance fixture 258e can provide haptic feedback to an operator of virtual tool 222v to keep virtual tool 222v within a guidance zone corresponding to a portion of environmental-display region 252 used to depict guidance fixture 258e, and provide additional haptic feedback to guide virtual tool 222v to the end of virtual rod 226v. Control buttons 256 of environment-display region 252 can be as described in the context of control buttons 246 of environment-display region 242. More, fewer and/or different control buttons than control buttons 256 can be utilized in other scenarios.

In other scenarios, display 250 can be used to monitor and control multiple haptic navigation sessions: for example, a robot arm can have three virtual tools corresponding to a shoulder, an elbow, and a wrist, with each virtual tool having up to 6-DOF. Then, if display 250 were used to control the robot arm, display 250 can control haptic navigation sessions for each of the virtual tools. As another example, a tool can have multiple controllable components (e.g., robot arms, robot hands, an engine/propulsion system), where some or all of the controllable components can be directed using haptic navigation session(s). Then, if display 250 were used to monitor and control such a tool, display 250 can control one or more haptic navigation sessions with the tool. Many other examples are possible as well.

In scenario 200, tools 220 and 222, controlled via respective displays 240 and 250 and corresponding haptic navigation sessions, construct the solar power array using sub-arrays T1-182 and T2-182. Scenario 200 can then end.

Example Virtual Fixtures

Figure 3A:
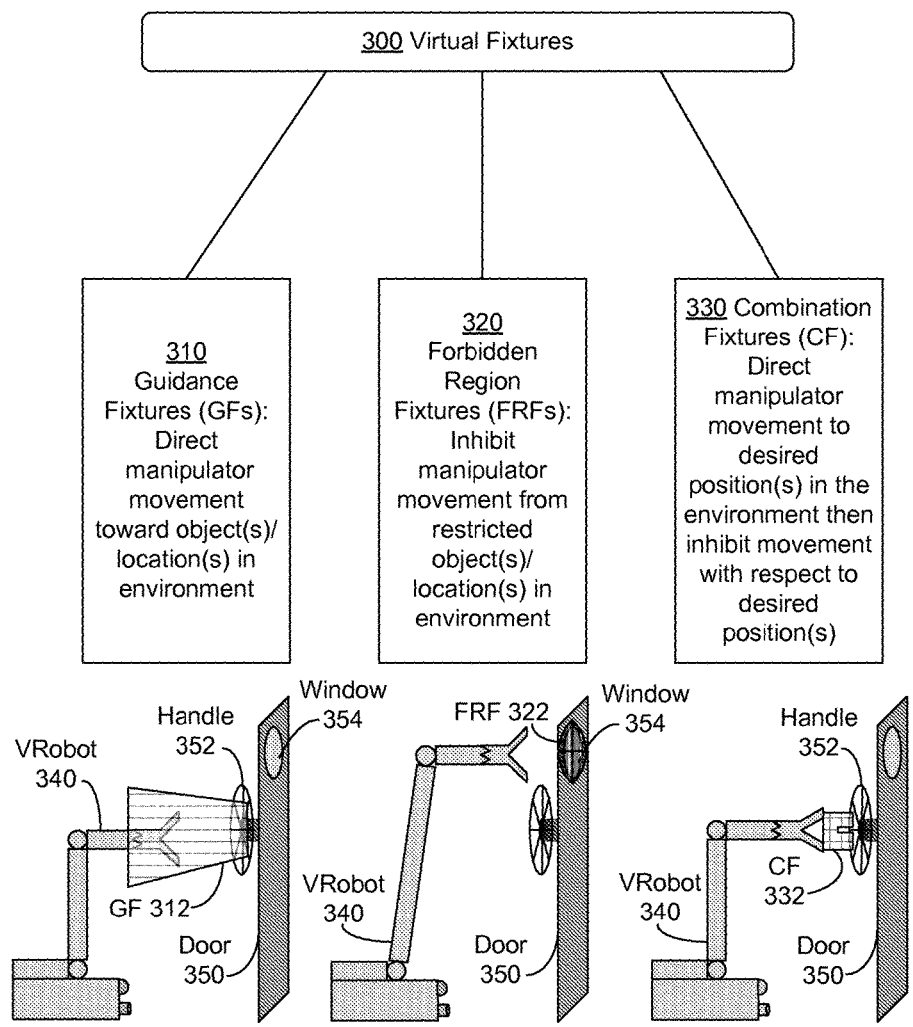
FIG. 3A illustrates some haptic virtual fixtures, in accordance with an example embodiment.

FIG. 3A illustrates virtual fixtures 300, in accordance with an example embodiment. Virtual fixtures 300 are provided in a virtual environment to help a human operator (or other entity) accomplish one or more tasks during a haptic navigation session by providing haptic feedback to guide a manipulator steering a virtual robotic tool in the virtual environment. By guiding the manipulator, virtual fixtures can guide the steering of a real-world robotic tool in a real-world environment represented in the virtual environment by the virtual robotic tool. In particular, FIG. 3A illustrates that virtual fixtures 300 include at least three examples of haptic virtual fixtures: guidance fixtures (GFs) 310, forbidden region fixtures (FRFs) 320, and combination fixtures (CFs) 330.

Guidance fixtures 310 can be used to instruct a human operator (or other entity) to direct a manipulator toward a desired location or region of the virtual environment. A guidance fixture 310 can be associated with a respective guidance zone for directing the operator to the desired location/region. Navigating using guidance fixture 310 includes providing intuitive force and torque feedback that guides the operator toward a desired location or region (e.g., a location or region where a task-related object is located). Guidance fixture 310 can provide force and torque feedback that feels to the operator like being directed by virtual forces toward the desired location/region. For example, when the operator attempts to command a manipulator in a direction outside of the guidance zone, the force rendering algorithm can calculate a reaction force to guide the manipulator back into the guidance zone. Further, when the operator attempts to command a manipulator in direction in keeping with the guidance zone, the force rendering algorithm can calculate a guidance force that eases manipulator passage within guidance zone. That is, the operator feels that moving toward the desired location/region is easier than moving outside of the guidance zone, and in some embodiments, or easier than moving away from the desired location/region even while remaining in the guidance zone.

For example, as shown at lower-left of FIG. 3A, a virtual environment is shown with virtual robot VRobot 340 representing a real-world robotic tool in a real-world environment with VRobot 340 in position to move toward handle 352 of door 350, where door 350, handle 352, and window 354 are virtual objects represented in the virtual environment, and with guidance fixture 312 directing a manipulator controlling VRobot 340 toward handle 352 of door 350. That is, guidance fixture 312 can provide force and torque feedback to ease motion of the manipulator controlling VRobot 340 while the manipulator is directing VRobot 340 toward handle 352. In some embodiments, guidance fixture 312 can provide force feedback to slow or stop motion of the manipulator controlling VRobot 340 while the manipulator is directing VRobot 340 to leave a guidance zone corresponding to the region of the virtual environment covered by guidance fixture 312.

Forbidden region fixtures 320 are virtual fixtures that are configured to inhibit motion of the manipulator with respect with to restricted objects and/or locations in the environment. Forbidden region fixtures 320 can provide non-conservative collision avoidance with restricted objects in dynamic environments; e.g., prevent an operator from instructing a manipulator to collide with a restricted object enclosed (at least in part) by a forbidden region. Haptic navigation provides the operator with intuitive force and torque feedback to notify when forbidden region fixture 320 is entered. To the operator, this feedback feels like a virtual force field. For example, when the operator attempts to command the manipulator into collision with an object, such as a valve, the force rendering algorithm can calculate a reaction force about a forbidden region surrounding the valve. The reaction force can cause the operator to direct the manipulator away from the collision, and so the manipulator does not penetrate the forbidden region. As such, collisions can be prevented while moving the manipulator, even in an unmodeled environment.

For example, as shown at lower-center of FIG. 3A, a virtual environment is shown with VRobot 340 in position to move toward window 354 of door 350. In this example, forbidden region fixture 322 is covering window 354, as window 354 is a restricted object. That is, if VRobot 340 gets within a forbidden region about window 354 provided by forbidden region fixture 354, then forbidden region fixture 322 can provide force and torque feedback to slow or stop motion of the manipulator controlling VRobot toward the restricted object; e.g., window 354.

Combination fixtures 330 are virtual fixtures that are configured to direct a manipulator operated by a human operator (or other entity) toward desired position(s) and/or object(s) in the virtual environment, and then inhibit at least some movements of the manipulator with respect to the desired position(s)/object(s). In some examples, combination fixture 330 can extend from a portion of a robotic tool controlled by a manipulator by the operator (or other entity) and so combination fixture 330 can move with the manipulator. Initially, combination fixture 330 can be moved by the manipulator without any reaction force/haptic feedback. Then, as combination fixture 330 (and thus the manipulator-controlled portion of the robotic tool) becomes partially alignment with the desired position(s)/object(s), force and torque reaction force(s) can be used to instruct the operator not to move combination fixture 330 away from already-aligned directions. For example, suppose combination fixture 330 (and thus the manipulator-controlled portion of the robotic tool) is aligned along a y-axis with the desired position(s)/object(s). Then, the force and torque reaction force(s) can be used to instruct the operator not to move the combination fixture in the y-direction and/or not to rotate while so configured. When combination fixture 330 is completely aligned with the desired position(s)/object(s), the force and torque reaction force(s) can instruct the operator not to move combination fixture 330, and thus the manipulator-controlled portion of the robotic tool, out of complete alignment with the desired position(s)/object(s). In some embodiments, when combination fixture 330 is in complete alignment with the desired position(s)/object(s), combination fixture 330 can allow manipulator movement intended to disengage from the desired position(s)/object(s)—that is, the combination fixture 330 allows movements to disengage to indicate task completion or that the task is being broken off.

For example, as shown at lower-right of FIG. 3A, a virtual environment is shown with combination fixture 332 attached to VRobot 340's manipulator, and with the manipulator in partial alignment with handle 352 of door 350, where handle 352 is a desired object for combination fixture 332. Combination fixture 332 is shown in FIG. 3A with a cavity that matches a support member of handle 352—if VRobot 340 grasps the support member, then VRobot 340 can apply force to turn handle 352. However, VRobot 340 will not be able to grasp handle 352 if VRobot 340 is not properly aligned with handle 352. Then, if VRobot 340 attempts to move to get out of alignment with handle 352, then combination fixture 332 can provide force and torque feedback to the operator to slow or stop motion of the manipulator controlling VRobot 340 from moving out of partial alignment with handle 352. Further, combination fixture 332 can allow other motions of the manipulator that maintain VRobot 340's partial alignment with handle 352—e.g., motions that bring VRobot into better and/or complete alignment with handle 352. Many other examples of virtual fixtures 300, guidance fixtures 310, forbidden region fixtures 320, and combination fixtures 330 are possible as well.

Guidance fixtures and forbidden region fixture can be static or dynamic. In some cases, a static guidance fixture with a corresponding static guidance zone can be used to direct the operator with respect to features will not or are unlikely to change; e.g., a permanent installation in the real-world environment, a right-of-way, a safe zone in a dangerous environment. A static guidance fixture with a corresponding static guidance zone can be used to direct the operator when the guidance zone and/or the desired location or region can change during operation. Similarly, a static forbidden region fixture can inhibit motion of the manipulator with respect with to features will not or are unlikely to change.

A dynamic guidance fixture with a corresponding dynamic guidance zone can change shape, position, and/or orientation. The guidance fixture and corresponding guidance zone can change based on input from the operator and/or based on the data from the real-world environment. For example, if a sensor data from the real-world environment indicates a desired feature has moved or a desired location has changed, then a dynamic guidance fixture and corresponding dynamic guidance zone can be updated to direct the operator toward the new position of the desired feature/location. As another example, if the operator notices a trend in movement of the desired feature/location, then the operator can alter the dynamic guidance fixture and corresponding dynamic guidance zone accordingly; e.g., if a desired feature is moving in a direction D1 (such as left, right, up, down, in, out, at a 45° angle, with the current, against the tide), e.g., the operator can move the guidance fixture in direction D1. In still other embodiments, software can predict the location of a moving desired feature/location and update a corresponding dynamic guidance fixture and corresponding dynamic guidance zone based on the predicted location. In some example, a dynamic guidance fixture can be partially static; e.g., allow guidance fixture movement within a pre-defined region/range of motion, fix one or more borders of the dynamic guidance fixture based on static features in the environment.

Dynamic forbidden region fixtures also change shape, position, and/or orientation. The forbidden region fixture and corresponding forbidden region can be based on the data from the real-world environment. For example, if a sensor data from the real-world environment indicates a restricted feature has moved and/or that a restricted location has changed, then a dynamic forbidden region fixture and corresponding forbidden region can move with the restricted feature/location and direct the operator away from the new position of the restricted feature/location. In some embodiments, human operators can change dynamic forbidden region fixtures; in other embodiments, human operators may be prevented from changing dynamic forbidden region fixtures; while in still other embodiments, some operators may change some dynamic forbidden region fixtures but not others; e.g., based on training/skill of the operator, based on the restricted feature/location, etc. For example, skilled operators may be permitted to modify most or all dynamic forbidden region fixtures, novice operators may not be permitted to modify any dynamic forbidden region fixtures, and intermediately-skilled operators may be permitted to modify some dynamic forbidden region fixtures and perhaps modify other forbidden region fixtures; e.g., pending supervisory or other authorization for such modifications. In still other embodiments, software can predict the location of a moving restricted feature/location and update a corresponding dynamic forbidden region fixture and corresponding dynamic forbidden region. In some example, a forbidden region fixture and corresponding forbidden region can be partially static; e.g., allow forbidden region fixture movement within a pre-defined region/range of motion, fix one or more borders of the forbidden region fixture based on static features in the environment.

Haptic feedback for virtual fixtures 300 can be provided based on a position of a virtual device in a virtual environment, such as the examples discussed above regarding feedback based on a position of VRobot 340 in the virtual environments having guidance fixture 312, forbidden region fixture 322, and combination fixture 332.

Haptic feedback for virtual fixtures 300 can also be provided based on derivatives of position (e.g., velocity, acceleration) of the virtual device in the virtual environment. In some embodiments, haptic feedback can be provided based on simulated spring generating spring forces between a commanded position and part or all of a proxy, where the commanded position is a control point of the virtual device for a human operator provided using a haptic interface device, and where the proxy represents at least part of the virtual device. In these embodiments, when the commanded position moves at high velocities with respect to the proxy, an oscillatory or "stuttering" feedback can be provided to the human operator—this feedback can be smoothed or eliminated by introducing a damping term of the spring forces, where the damping term is based on the velocity of the proxy with respect to the commanded position.

In other embodiments, one or more features of virtual fixtures can be based on derivatives of position of the virtual device. For example, a size and shape of a guidance virtual fixture can be based on the velocity of the virtual device—a slower-moving (i.e., lower speed) virtual device can be guided using a smaller guidance virtual fixture than a faster-moving (i.e., higher speed) virtual device. Additionally, if a direction of velocity for the virtual device is toward a desired position/location for the guidance virtual fixture, portions of the guidance zone opposite to the direction of velocity (i.e., portions of the guidance zone trailing behind the virtual device) may be removed from the guidance zone and new portions inserted if the direction of velocity is away from the desired position. In particular embodiments, a virtual device interacting with a guidance feature can be completely stopped if the speed (magnitude of velocity) of the virtual device exceeds a predetermined speed threshold.

Similarly, a size of a forbidden region fixture can be based on the velocity of the virtual device—a forbidden region fixture can grow or shrink, respectively, based on respective increases or decreases of the magnitude of velocity of the virtual device. Additionally, a forbidden region fixture can grow or shrink, respectively, based on a direction of velocity heading toward or away, respectively from the forbidden region fixture (e.g., the forbidden region feature can respectively grow or shrink when collision between the virtual device and restricted object(s)/location(s) for the forbidden region fixture seems respectively more likely or less likely based on the direction of velocity of the virtual object).

Accelerations of the virtual object can be used to determine sudden changes in direction—if acceleration or the derivative of acceleration, respectively, exceeds a respective predetermined acceleration threshold or respective predetermined derivative of acceleration threshold, then motion of the virtual object can be slowed, stopped, or rejected to ensure safety and/or avoid damage to a robotic tool operating in the real-world environment.

A guidance feature can have a "simulated viscosity" that depends on the velocity of the virtual position. For example, a forbidden region fixture can provide more haptic feedback to simulate an increase in viscosity when the velocity of the virtual object is approaching a restricted region/location, and can reduce haptic feedback to simulate a decrease in viscosity when the velocity of the virtual object is moving away from a restricted region/location. Similarly, a guidance fixture can provide more haptic feedback to simulate an increase in viscosity when the velocity of the virtual object is moving away from a desired region/location, and can reduce haptic feedback to simulate a decrease in viscosity when the velocity of the virtual object is moving toward a desired region/location. Additionally, a combination fixture can provide more haptic feedback to simulate an increase in viscosity when the velocity of the virtual object is directed to reducing alignment between the combination feature and a desired object, and can reduce haptic feedback to simulate a decrease in viscosity when the velocity of the virtual object is directed to increasing alignment between the combination feature and a desired object. Other possibilities for using position and/or derivatives of position of a virtual object to provide haptic feedback are possible as well.

Figure 3B:
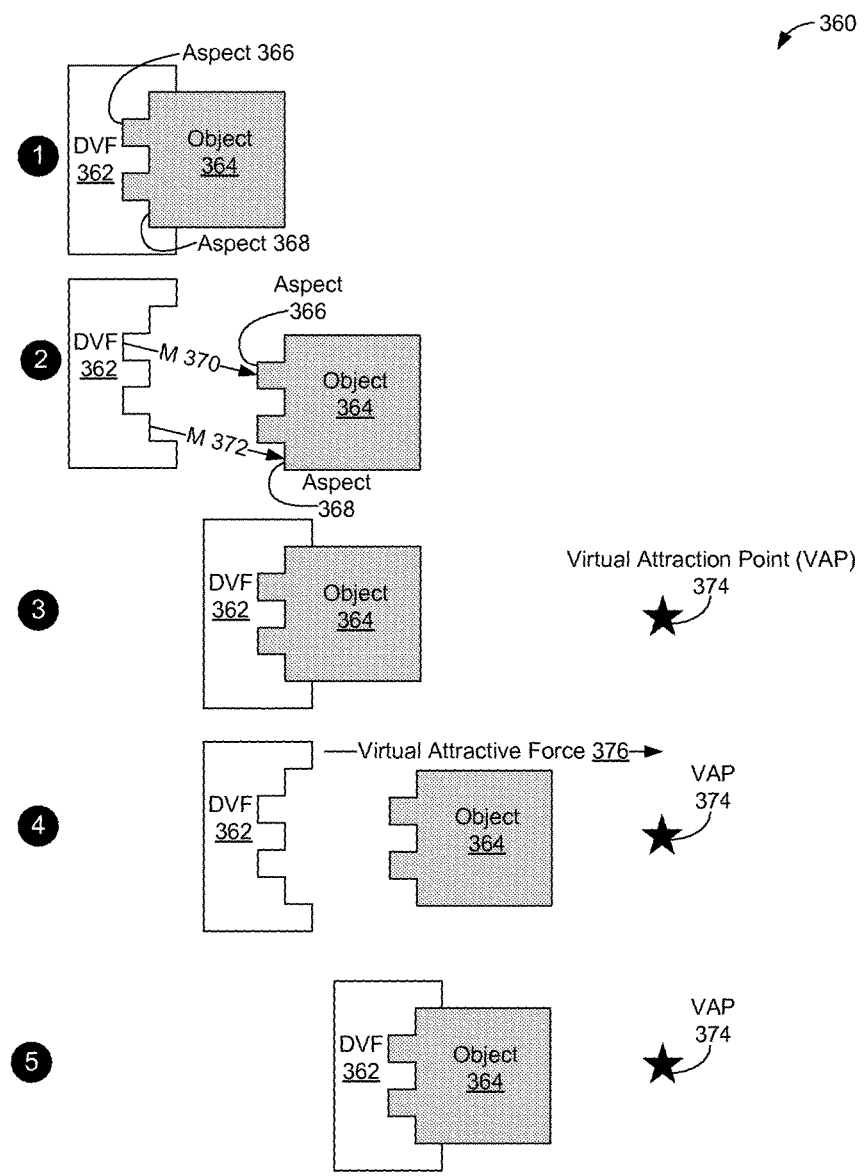
FIG. 3B depicts a scenario where an object moves and a related dynamic virtual fixture tracks movements of the object, in accord with an example embodiment.

FIG. 3B depicts a scenario 360 where object 364 moves and related dynamic virtual fixture (DVF) 362 tracks movements of object 364, in accord with an example embodiment. In scenario 360, dynamic virtual fixture 362 can be a guidance fixture, a forbidden region fixture, or a combination fixture in a virtual environment. Object 364 can be a virtual object in the virtual environment with dynamic virtual fixture 362, where object 364 represents a real-world object O1 in the virtual environment, and where object O1 is in a real-world environment.

At the onset of scenario 360, shown in the portion of FIG. 3B labeled with an encircled number "1" at the left side of the Figure, dynamic virtual fixture 362 and object 364 are shown as being in complete alignment. Object 364 and corresponding real-world object O1 have aspects 366, 368 that have been identified; for example, aspects 366, 368 can be identified as having distinct geometries, colors, materials, sensor response, human operator (or other entity) identification/selection, and/or for other reasons.

Scenario 360 continues, as shown at position "2" of FIG. 3B, with object 364 moving down and to the right. The movement of object 364 in the virtual environment tracks movement of object O1 in the real-world environment throughout scenario 360 in general, and at position 2 as well. Dynamic virtual fixture 362 can identify respective movements (M) 370, 372 of aspect 366, 368 from their respective previous locations adjacent to dynamic virtual fixture 362 to their new locations down and to the right. Dynamic virtual fixture 362 can then move in a direction corresponding to movements 370, 372 to become aligned with object 364.

Scenario 360 continues, as shown at position "3" of FIG. 3B, after dynamic virtual fixture 362 has moved down and to the right to track object 364, leading to dynamic virtual fixture 362 and object 364 being aligned again. Position 3 of FIG. 3B also shows a virtual attraction point (VAP) 374 in the virtual environment. 364. In scenario 360, virtual attraction point 374 can act as a proxy of object 364 for dynamic virtual fixture 362. When object O1 moves in the real-world environment, object 364 in the virtual environment makes a corresponding move in the virtual environment. Once dynamic virtual fixture 362 determines that object 364 has moved (i.e., dynamic virtual fixture 362 is no longer in complete alignment with object 364) dynamic virtual fixture 362 can move toward virtual attraction point 374 as if dynamic virtual fixture 362 was connected to virtual attraction point 374 by a spring. The movement of dynamic virtual fixture 362 toward virtual attraction point 374 can be stopped when dynamic virtual fixture 362 comes in contact with object 364 (or in other scenarios, with another object in the virtual environment).

Scenario 360 continues, as shown at position "4" of FIG. 3B, with object 364 moving to the right, so that dynamic virtual fixture 362 and object 364 are no longer in complete alignment. Then, as dynamic virtual fixture 362 is not completely aligned, virtual attractive force 376 can act as a spring force on dynamic virtual fixture 362 in the direction of virtual attraction point 374. Since, at position 4 of scenario 360, dynamic virtual fixture 362 is no longer in complete alignment with object 364 and no (other) object is in contact with dynamic virtual fixture 362 to resist virtual attractive force 376, virtual attractive force 376 can move dynamic virtual fixture 362 toward virtual attraction point 374 and, thereby toward object 364, as if dynamic virtual object 362 was connected to virtual attractive point 374 via a spring.

Scenario 360 continues, as shown at position "5" of FIG. 3B, after virtual attractive force 376 has moved dynamic virtual fixture 362 to the right to a position of complete alignment with object 364. After dynamic virtual fixture 362 is completely aligned with object 364, scenario 360 can end.

In still other scenarios, attractive forces such as virtual attractive force 376, can act upon a dynamic virtual object to cause motions other than straight-line motion. For example, if object O1 moves along an arbitrary trajectory T1, then object 364 will track trajectory T1. In this example, one or more virtual attraction points associated with object 364 can be used to locate and provide forces that move dynamic virtual fixture 362 along trajectory T1 toward object 364. Other forces can act upon dynamic virtual fixture 362 as well; e.g., such as forces intended to repel dynamic virtual fixture 362 from objects along trajectory T1 when dynamic virtual fixture 362 collides with (or approaches) forbidden regions along trajectory T1.

Haptic Navigation Related to Underwater Tasks

Figure 4:
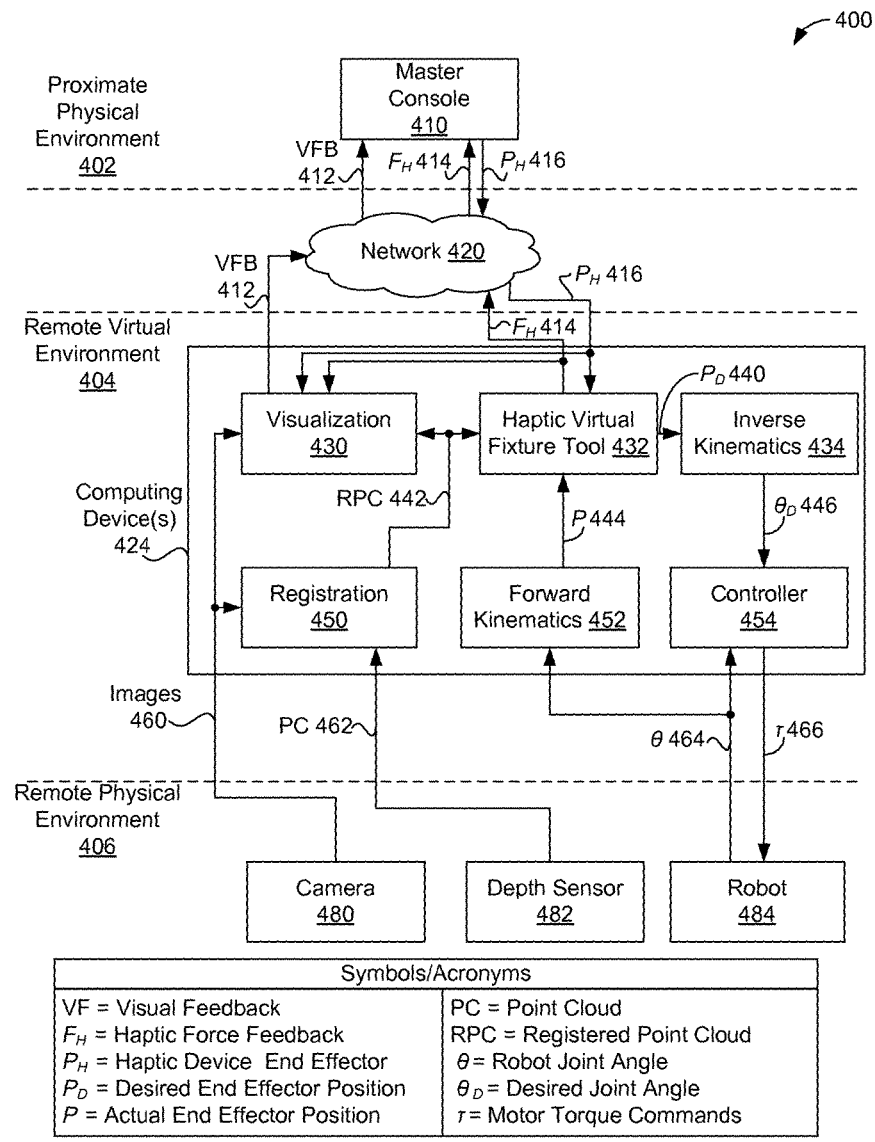
FIG. 4 is a block diagram of a system for a proximate operator to perform tasks in a remote physical environment, in accordance with an example embodiment.

FIG. 4 is a block diagram of system 400, in accordance with an example embodiment. System 400 can be configured to carry out the herein-described techniques for haptic navigation; e.g., to carry out tasks underwater or in other environments. These underwater tasks can include tasks for search and rescue, underwater infrastructure maintenance, repair, mining, military operations, and waste cleanup. Operations in the deep sea, or hazardous marine environments, typically require manipulation from ROVs. For example, haptic rendering can be used in the context of an omnidirectional mobile robot with underwater grippers; e.g., ROV 162 discussed above in the context of FIG. 1.

Subsea manipulation is a challenging task, and one that is necessary in a number of applications. Examples include the construction of cabled ocean observatories, biological studies of hydrothermal vent colonies, oil and gas operations, subsea mining, and other activities that require precise movement on the seafloor. In these applications, a human operator's perception is important, especially in the presence of disturbances due to currents, low visibility situations, or other scenarios that require adaptation. Another difficulty in performing manipulation tasks with remote robots arises in making precise motions and interactions in the presence of dynamically changing environments. These include objects or structures that must be avoided or protected. These objects can be moving, and possibly changing in size. For example, in underwater manipulation for repair (e.g., oil platforms) or for biological sampling, precision manipulation is required despite disturbances from water flow and turbulence.

Underwater tasks can involve manipulation in the vicinity of sensitive or delicate structures. Enhancing visual features, such as scaling and tremor dampening, can improve performance. However, operator error, communication delay and limited visual feedback can cause a robot to be accidentally driven into sensitive structures and result in irreparable damage. The problem is further amplified in the absence of haptic feedback to the operator. If the contact is not visually detected by the operator, a resulting collision can cause serious damage.

Consider, for example, the common task of mating electrical connections underwater. In principle this is a simple maneuver; however, operators often find it difficult to successfully mate connections using underwater manipulators, such as robot arms including the ARM 5E MINI five-function electric manipulator configured for subsea use. At best, this difficulty results in excessively long duration operations that drive up the cost of subsea operations. At worst, hardware is destroyed, often requiring expensive replacements. Further, operational costs for ROVs can be expensive. Thus, there is great incentive to maximize the efficiency and capability of human/co-robot manipulation tasks in subsea environments.

Underwater sensors, such as some or all of the sensors discussed above as sensor systems 142, 144, and 152 of FIG. 1, can be used provide range measurements for 3-DOF and 6-DOF haptic rendering to carry out underwater tasks. The range measurements can be used to provide haptic feedback to a human operator, giving with a sense of touch along with a visual representation objects seen by the camera. An operator can use a physical haptic device to interact with objects in a virtual environment thereby carrying out the underwater tasks. This virtual environment can consist of representations of physical objects, as captured by sensor data, virtual objects that are entirely computer simulated, or combinations of representations of physical objects and virtual objects. A HIP can be thought of as the position of a 3-DOF end effector in virtual space that matches the position of the haptic device. For 6-DOF end effectors, a virtual tool can represent the end effector. When the user moves the haptic device, the HIP or virtual tool can move accordingly in the virtual environment.

For example, a human operator can use a remotely-operable robotic device equipped with the underwater depth-enabled camera to direct robotic removal of ordnance from lake, river or sea bottoms. An added feature of the herein-described techniques is prevention of robot end effector contact with undesirable locations through imposition of virtual fixtures.

Providing haptic feedback from underwater sensors to an operator at the surface has the potential to transform subsea manipulation capability. The virtual fixtures can be defined with respect to absolute location(s) in task space and implicitly defined by data from sensors in the remote environment. The virtual fixture can adapt to moving targets and that external disturbances automatically will be rejected. For example, an underwater current can move, and thus disturb, an underwater manipulator. In another example, an external disturbance in a surgical context can occur when a patient moves (or is moved) during a surgical procedure. Virtual fixtures will allow manipulators to precisely maneuver in sensitive environments where contact should not be made with surrounding objects or structures. Biological studies of animal colonies around hydrothermal vents could benefit greatly from such a capability—allowing scientists to carefully gather data with unprecedented resolution and proximity to sensitive organisms. Common tasks such as connector mating between instruments can be carried out very efficiently by creating guidance fixture near male and female connectors. Thus, time, expense, and equipment can be saved, and the environment preserved using the herein-described haptic feedback techniques to perform underwater tasks.

Virtual fixtures can be part of a work plan to carry out operations in a remote environment based on common manipulation subtasks. Example subtasks include:

Grasping—a virtual fixture can aid the operator in positioning a remote manipulator for a successful grasp of an object of interest.

Tool usage—robots often tend to utilize tools; e.g., subsea remotely operated vehicles regularly use torque tools. Virtual fixtures can be used to guide/control tool usage by remote manipulators.

Rotational manipulation and translational movements—a virtual fixture can be used for turning objects; e.g., valves, door handles, parts by the remote manipulator and/or via tools utilized by the remote manipulator.

Insertion/Removal—many operations require coupling/decoupling of connectors or subsea equipment. Such operations can be guided by virtual fixtures that aid the operator in linear insertions/removals and other related tasks.

Placement—a virtual fixture can be used to help position equipment and/or tools accurately with respect to the environment.

Many other subtasks are possible as well.

Complex tasks, particularly sequential tasks, can benefit from multiple, adaptive virtual fixtures. The virtual fixtures can change as tasks in part of a work plan, or series of sequential tasks, are completed—for example, a virtual fixture can start as a guidance fixture for guiding operator to a region to perform a task and then, once the task is complete, the virtual fixture can change to a forbidden-region fixture to keep the operator from the region to avoid undoing previously-completed work. The herein-described apparatus are capable of rendering multiple virtual fixtures in a virtual environment and switching between them in an intuitive, fluid fashion in real time, in response to the environment and performance needs.

Virtual fixtures can aid the human operator in complex manipulation tasks. These tasks can be planned and carried out using automated and sequential transitioning between virtual fixtures. During execution of the tasks, a level of automation can change from manual operation to fully autonomous operation, perhaps with one or more intervening levels of semi-autonomous operations possible. The human operator can adjust the level of automation and also intervene as necessary during autonomous operation. For example, during human-only or mostly-human operation, a flexible guidance fixture can be used that allows for small deviations from a guided path, where the deviations can be subject to guiding but non-constrained feedback, so to provide the operator increased flexibility and control over the situation.

Table 1 below illustrates how virtual fixtures can be used in semi-autonomous mode (with both a human and an automated control loop) and in fully autonomous operation of system 400. In the latter, system intent is still communicated to the operator using our haptic rendering algorithms, thereby providing an intuitive method for the operator to supervise (but not control) the task. Conversely, the virtual fixtures can be used to communicate the outcome of the operation in manual/human control.

TABLE 1

| Level of Automation | Role of Virtual Fixtures |
| --- | --- |
| Fully autonomous operation | During fully autonomous operation, virtual fixtures can communicate the intent of the autonomously-operating system to the human operator. The intent of system 400 can be shown with visual cues/displays (e.g., highlighting target position(s) in the workspace), auditory signal(s), and/or haptic feedback. |
| Semi-autonomous operation | During semi-autonomous operation, system 400 can use both the experience and cognition of the human operator linked with its own precise spatial awareness.<br>In semi-autonomous operation of system 400, a human operator can make decisions within ranges of boundaries determined by likelihood estimates. The operator can change the ranges of boundaries to effectively modify the level of automation.<br>Controlling ranges of boundaries for decision gives the operator an intuitive control to the level of automation during semi-autonomous operation.<br>The operator can make higher-level decisions; i.e. ability to change a planned path within the range of boundaries, or to intervene to avoid impending difficulties. Virtual fixtures can reside on a lower level such that a positioning task always will be made exactly, and such that unintended collisions with the manipulator are prevented, mainly using force feedback. |

TABLE 1-continued

| Level of Automation | Role of Virtual Fixtures |
|---|---|
| Manual operation | During manual operation of system 400, all manipulation tasks can be done manually; e.g., without virtual fixtures. Instead of completely turning off the virtual fixtures, the virtual fixtures can operate in the background without sending feedback to a human operator.<br>Virtual fixtures can communicate the outcome of the manual operator commands to the temporarily deactivated autonomous system. By keeping the autonomous system up to date, the amount of time taken during switchover from manual to (semi-) autonomous operation can be reduced. |

A human operator and/or software of system 400 can vary the level of automation afforded to the system. For example, simpler manipulation tasks may be controlled by system 400 operating in the fully autonomous mode with the operator providing position commands that reflect high-level decisions. If an unusual or exceptional event occurs (hence complexity increases), the operator can reduce the level of automation utilized by system 400. Combining the experience and skill of a human operator with the spatial awareness of the manipulation system, along with an adjustable autonomy framework, can both increase efficiency and reliability of operations and allow execution more complex tasks than would otherwise be feasible with traditional manual or autonomous solutions.

A complex operation can be planned using standardized virtual fixtures; e.g., the operation can be specified as a sequence or other set of tasks, with each task shaped by virtual fixtures. When defined this way, both the human operator and system 400 will be able to readily interpret this plan. Additionally, since system 400 can also track the outcome of each task, procedural compliance can be observed. If important steps are skipped, the human operator can be notified and/or other actions taken; e.g., remote actuators can be put into hibernation or a reduced-performance mode until the correct task is begun.

Task execution and/or outcome information can be stored in log files and/or other data structures. The log files can be sparse representations of already completed tasks. Log files can later be used to generate performance statistics and maintenance schedules. For example, if an operation is performed by a robotic tool, such as robot 484 of system 400, then a record of the operation can be recorded and stored in the log file. Then, the log file can be compared to the plan to determine: whether of the operation was correct (or incorrect) in the context of the plan, whether the specific procedures used in carrying out the operation were appropriate (or inappropriate), and whether other evaluations of the plan and its execution can be evaluated.

The log file can be used to determine position and other information about robotic tools and the environment during aspects of plan execution, and/or to provide data for reenactment/replay of plan execution. For example, the log file can be processed to determine commands executed by various components of system 400, and a test version of system 400 (e.g., a simulator version of system 400 for training, system 400 configured without connection to devices in a real-world environment) can simulate execution of these commands to provide operator displays, virtual fixtures, etc. of a virtual environment as were provided during plan execution. This simulated execution of previously executed plans can be used to train human operators of system 400, reconstruct plan execution perhaps during a post-mortem of plan execution, generate simulations showing performance of system 400, and/or for other uses.

System 400 can support flexible planning, allowing for some steps to be loosely defined (a necessary feature when operating in un-structured or dynamic environments). For instance, the system might be aware that a lever needs to be pulled, but not which one. When the uncertain part of the plan is reached, the human operator will be asked to guide the system to the right lever using a point-and-click interface.

To best perform the task, the human operator should not perceive that the virtual fixtures of system 400 are taking over completion the task and that the human is just riding along with an automated system. If the human operator is not sufficiently engaged, the human operator might be overly passive and perhaps reduce focus and performance. For forbidden-region virtual fixtures, preventing passivity is straightforward since forces are only sent when an operator is attempting entry into a forbidden region. That is, haptic feedback can be reasonably expected once the operator realizes the interaction with the forbidden region.

For guidance virtual fixtures and combined fixtures, however, a human operator of system 400 may not always anticipate the activation of a guidance force. Thus, virtual fixtures can use auditory and visual feedback, in addition to haptic to increase the operator's situational awareness during manipulation tasks. This multi-sensory feedback can give the human operator a clear indication when a guidance force is about to be activated. For instance, visual feedback related to virtual fixtures can provide visual indications and/or auditory feedback related to virtual fixtures can emit sounds to indicate regions in task space in which the guidance force will be activated.

On-the-fly definition of virtual fixtures, including definition of virtual fixtures based upon very recent sensor data taken from an environment, can enhance the high-level architecture of planned operations constructed by standardized virtual fixtures. For this, a combined range and video sensor can be used by system 400. The sensor can provide data at a first rate and based on the sensor data, force feedback can be generated at a second, faster rate. In some embodiments, the first rate can be at least 16 Hz and/or the second rate can be at least 500 Hz. The system can utilize processors, such as graphics processing unit (GPU) hardware and a customized parallelized low-level GPU, to process the sensor data at least the first rate and generate force feedback at the second rate.

FIG. 4 shows system 400 is shown with respect to three environments: proximate physical environment 402, remote virtual environment 404, and representing remote physical environment 406. As one of many possible examples, remote physical environment 406 can be an underwater environment.

In proximate physical environment 402, master console 410 can be, or include, a computing device configured to enable a human operator (not shown in FIG. 4) to interact with remote physical environment 406. For example, master console 410 can have a computing device, haptic interface device, and display configured to provide visualizations, such as computing device 720b, haptic interface device 716, display 712, and visualization 718 discussed below with respect to FIG. 7A.

Master console 410 can communicate with network 420. FIG. 400 shows that master console 410 can receive feedback from network 420, such as visual feedback (VFB) 412 and haptic force feedback 414 ($F_H$), and can send commands, such as commands with a haptic device, or instructed, end effector position 416 ($P_H$) of a remotely-controlled device in remote physical environment 406, such as robot 484.

Network 420 can connect computer devices in proximate physical environment 402 and remote physical environment 406; e.g., connect master console 410 with computing device 420. For example, network 420 can have some or all of the functionality of network 710 of FIG. 7A discussed below. FIG. 4 illustrates that network 420 can communicate data, including but not limited to, visual feedback 412, haptic force feedback 414, and haptic device position 416, between proximate physical environment 402 and remote physical environment 406.

Remote virtual environment 404 can include computing device(s) 424 configured to communicate with network 420 and remote physical environment 406. For example, computing device(s) 424 can have some or all of the functionality of computing device 720a of FIG. 7A. FIG. 4 indicates that computing device(s) 424 can include visualization module 430, haptic virtual fixture tool module 432, inverse kinematics module 434, registration module 450, forward kinematics module 452, and controller module 454. Some or all of modules 430, 432, 434, 450, 452, 454 can include software executable on processor(s) of computing device(s) 424.

FIG. 4 shows that remote physical environment 406 can include sensors, such as camera 480 and depth sensor 482, and robot 484. For examples, camera 480 can be or include one or more of depth enabled cameras 746a, 746b, 746c, 746d shown in FIG. 7A and robot 484 can be or include remote controlled device 736 also shown in FIG. 7A. In some embodiments, camera 480 can include depth sensor 482 and be configured for underwater use.

In operation, camera 480 can capture light within remote physical environment 406 and generate images 460. At the same time, depth sensor 482 can capture a 3D depth map of remote physical environment 406 in the form of point cloud 482 obtain depth information about and generate point cloud (PC) 462. Robot 484 can obtain data about actual robot joint angle(s) for actuator(s), effector(s), robot arm(s), and/or other component(s) of robot 484. The data about actual robot joint angle(s) is shown in FIG. 4 as robot joint angle (A) 464. Images 460, point cloud 462, and robot joint angle 464 can be communicated to computing device 424 in remote virtual environment 404.

More specifically, FIG. 4 shows that images 460 are communicated to registration module 450 and visualization module 430, point cloud 462 is communicated to registration module 450, and robot joint angle 464 is communicated to forward kinematics module 452 and controller module 454.

For point cloud 462, point cloud 462 can be registered in the robot frame to aid processing within system 400. FIG. 4 shows that registration module 450 registers point cloud 462 to generate registered point cloud (RPC) 442. To register point cloud 462, registration module 450 can generate a transformation between point cloud 462 and a point of view of robot 484 based on image(s) 460. Registered point cloud 442 can then be communicated from registration module 450 to visualization module 430 and haptic virtual fixture tool module 432.

Visualization module 430 can use visual data from image(s) 412, depth data from registered point cloud 442, and information related to virtual fixtures to generate visual feedback 412. Visual feedback 412 can also include visual information related to haptic force feedback 414; i.e., if haptic force feedback 414 indicates a force due to collision with an object or virtual fixture, then corresponding visual feedback; e.g., a visual collision alert or other indication of collision, can be added to visual feedback 412. Similarly, end effector position commands, such as end effector position 416, can be used in visual feedback; e.g., if end effector position 416 indicates that an end effector moves in a direction D, then visual feedback 412 can show corresponding movement of (a visualization of) an end effector of robot 484.

Forward kinematics module 452 can convert robot joint angle 464 to end effector coordinates (P) 444. Haptic virtual fixture tool module 432 can employ registered point cloud 442, end effector coordinates 444, information related to virtual fixtures, and end effector position 416 to compute and provide haptic force feedback 414 to the operator via master console 410 and network 420. Haptic virtual fixture tool module 432 also can compute and communicate desired end effector position ($P_D$) 440 to inverse kinematics module 434. Inverse kinematics module 434 can convert desired end effector position 440 to desired joint angle(s) ($\theta_D$) 446, which in turn can be converted into motor torque commands ($\tau$) 466 by controller module 454. Upon reception of motor torque commands 466, robot 484 can move motor(s) in accord with the received commands 466. In some embodiments, robot 484 can have multiple controllable components; e.g., have multiple arms and/or end effectors. In still other embodiments, robot 484 can be mobile and move in accord with commands provided from master console 410. In these embodiments, motor torque commands 466 can be generated to move part or all of robot 484. In still other embodiments, system 400 can use multiple cameras 480, depth sensors 484, and/or robots 484 in remote physical environment 406, which can be controlled by one or more operators at master console 410 and using information provided by computing device(s). Other configurations of system 400 are possible.

An Example Virtual Fixture Method and Related Scenario

Figure 5A:
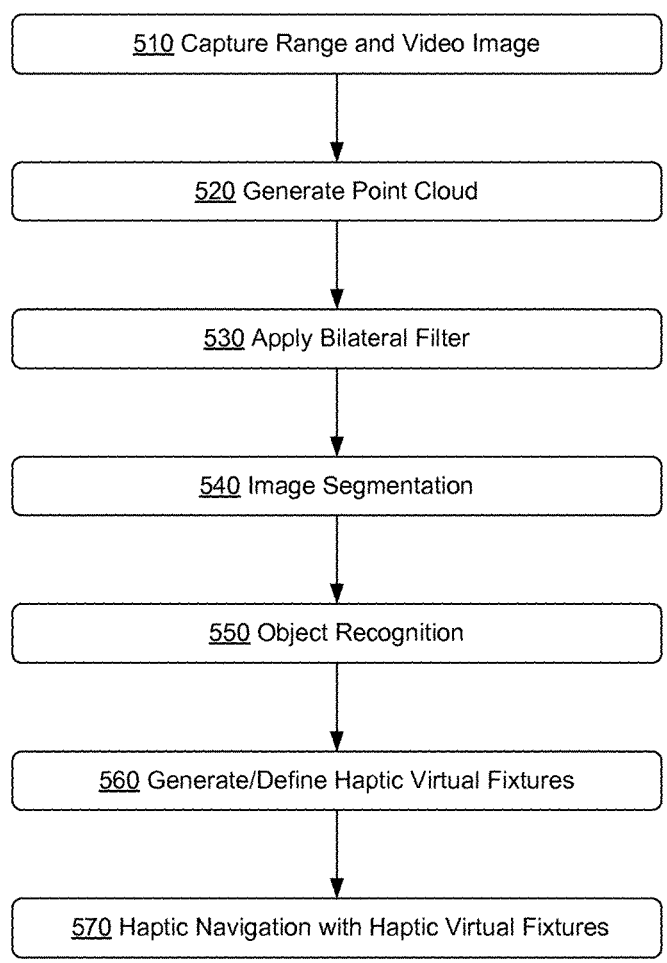
FIG. 5A is a flow chart of a method for generation of virtual fixtures, in accordance with an example embodiment.

FIGS. 5A and 5B are flow charts illustrating method 500 for generation of virtual fixtures, in accordance with an example embodiment. Method 500 can be carried out by a computing device, such as computing device 424 of system 400 and/or computing device 820. In some embodiments, part or all of method 500 can be carried out by one or more components of a computing device, such as haptic virtual fixture tool module 432 of computing device 424 in system 400.

As shown in FIG. 5A, method 500 can begin at block 510, where range and video image data can be captured. For example, a computing device carrying out operations of method 500 can receive one or more range measurements and/or depth images at block 510, use sensor systems to obtain range and video image data, or otherwise obtain range (depth) and video image data.

At block 520, a point cloud can be generated from the range and video image data. The point cloud can be a collection of points in a frame of reference, such as a collection of Cartesian points in a three-dimensional space where the points correspond to objects whose images are captured at block 510. In some embodiments, sensor fusion techniques can be used to combine data from multiple sensors, such as the range and video image data. In other embodiments, other data structures, such as data structures for range measurements (including data structures for depth images), can be utilized and/or generated at blocks 510 and 520.

At block 530, a bilateral filter can be applied. Bilateral filters can be used to smooth data within the point cloud by weighted a value associated with point; e.g., a depth value, with a weighted average of values from nearby points. For example, the points can be weighted using a Gaussian kernel as a function of Euclidean distances in a Cartesian frame. In some embodiments, block 530 can be omitted. In other embodiments, other filters can be applied instead of or along with the bilateral filter. In some embodiments, normal values can be determined for points in the point cloud. For example, method 500 can be utilized to carry out part or all of a haptic interaction algorithm for 3-DOF or 6-DOF haptic rendering.

At block 540, the image obtained at block 510 can be segmented. That is, each pixel in the video image can be assigned a label. Each label can represent visual characteristics; e.g., a range of colors, a location on a boundary (or within the interior) of an object, etc. Two pixels assigned to the same label have the same visual characteristics.

At block 550, objects can be recognized from the segmented image. In some embodiments, recognized objects can be associated with collections of points within the point cloud. For example, suppose an apple is recognized in the segmented image and that the apple is depicted in a set of pixels SP of the segmented image. Let SPt be the set of points in the point cloud associated with pixels SP. Since SP is associated with the apple, then SPt can be associated with the apple as well.

In some embodiments, part or all of the processing involved with blocks 530, 540, and/or 550 can be omitted. For example, in embodiments where a human operator (or other entity) recognizes objects from the point cloud and/or video image data of block 520, then the part or all of the recognition taking place at block 550 (and perhaps any processing at block 530 and/or block 540 that supports the processing at block 550). In other embodiments, other processing related to image recognition than occurs at blocks 530 and/or 540 can be utilized to support the processing at block 550.

At block 560, haptic virtual fixtures can be defined and/or generated. The virtual fixtures can be tracked and adapted to changes in the task space; e.g., as tasks of a plan are added, completed, updated, and removed; and to changes in the remote environment; e.g., as objects move or change shape. For example, the one or more objects can be the object(s) recognized at block 550. To continue the example from block 550, a virtual fixture VFa can be associated with SP and SPt, and thus be associated with the recognized apple. Then, if the apple moves in a later image captured at block 510, the apple can be re-recognized in the later image at block 550, and virtual fixture VFa reassociated with the moved apple. Thus, virtual fixtures can be dynamically associated at block 560 with objects in an environment captured in the range and video image data obtained at block 510 and recognized at block 550.

The virtual fixtures can be defined with respect to a specification of one or more objects. The specification of object(s) can be provided by a human operator (or other entity); e.g., the human operator can select object(s) from a pre-defined plurality of objects and/or the human operator can draw or otherwise define the object(s). The specification of objects can be provided from data obtained in the real-world environment and/or the virtual environment. The specification of object(s) can be provided from an external source; e.g., a specification of (data about) an object can be provided by the manufacturer, owner, and/or other entity related to the object and imported into the computing device. Other techniques for specifying objects are possible as well.

Virtual fixtures can be generated at various times during task completion. For example, virtual fixtures can be generated prior to the task beginning, perhaps in conjunction with a task list; e.g., if a particular task can utilize one or more virtual fixtures, then the one or more virtual fixtures can be generated and then associated with the task list. This task list and associated virtual fixtures can be generated prior to starting one or more operators associated with the task list. For example, the task list can be generated and used to practice the task prior to actual task implementation and completion. This task list and associated virtual fixtures can be used for autonomous or semi-autonomous completion of the tasks. When the task is to be performed, the generated virtual fixtures can be retrieved from the task list and provided to a virtual environment to carry out the task.

Virtual fixtures can also be generated during task completion. For example, a human operator can choose, modify, and/or create virtual fixtures either before or during task completion. The human operator can select virtual fixtures for creation from a "toolbox" containing several virtual fixtures. The virtual fixture(s) can be selected via a computerized search for a particular virtual fixture, where; e.g., a keyword based search, search for a particularly-identified virtual fixture (for example, virtual fixture #3 for Task 7 of Plan 123), a visual search, a database query, via inspection by the human operator of virtual fixtures in the toolbox; e.g., selection of virtual fixture(s) via graphical, textual, auditory, and/or other information about the virtual fixtures, and/or via other techniques.

After selection, the human operator (or other entity) can modify and/or combine virtual fixtures to generate a specific virtual fixture. In some embodiments, the toolbox can be separate from a virtual environment used to control real-world tools. In other embodiments, the toolbox can import data from the virtual environment, such as information about objects in the real-world environment, to aid in virtual tool selection/combination/modification. Once the specific virtual fixture is generated, the specific virtual fixture can be introduced into a virtual environment, stored in the toolbox, and/or tested in the toolbox. In some cases, the specific virtual fixture will not meet the human operator's (or other entity's) requirements, and so can be discarded.

In other scenarios, virtual fixtures can be generated based on scans of sensor systems—techniques related to generating virtual fixtures based on scans are discussed below in more detail in the context of FIG. 5B.

In other embodiments, the virtual fixtures can be specified in terms of geometry in a remote environment and/or in a virtual environment. For example, a virtual object can be introduced into the virtual environment; e.g., a virtual cube or sphere. Then, a virtual fixture can be associated with the virtual object. As another example, the virtual fixture can be defined with respect to a geometric region, volume, or other entity in either the remote or virtual environment without respect to another object. Other examples of method 500 are possible as well.

In some scenarios, the captured range and video image data is insufficient; e.g., in cases of significant measurement noise or sensor occlusion. Measurement noise may be suppressed using filtering such as discussed above with respect to block 530. To account for sensor occlusion, occlusion by a remote manipulator can be predicted based on detailed models of the remote manipulator, kinematic equations, and data about manipulator positioning. Then, sensor data can be rejected that correspond to regions predicted to be occluded by the remote manipulator. In the rejected regions, sensor data can be interpolated using previously captured data. Further, by predicting a position of the remote manipulator for occlusion, the predicted position can also be used to verify the state of the manipulator during runtime, and so enhance operational safety.

At block 570, one or more haptic navigation sessions can be conducted that utilize the range and video image data, point clouds, images, objects, and/or haptic virtual fixtures. For example, to complete a particular task as part of a haptic navigation session, a virtual environment can be initialized using sensor data from a real-world environment obtained at block 510 and refined via blocks 520-550. The sensor data can include data about one or more real-world tools; e.g., an ROV or other robotic tool, used to carry out the specific task in the real-world environment. The virtual environment can then include one or more virtual tools, where each virtual tool can represent, and be used to control operation of, a corresponding real-world tool.

If any virtual fixtures are associated with the particular task, the virtual fixtures generated at block 560 that are associated with the particular task can be introduced into the virtual environment. Then, the human operator can use one or more controllers having haptic feedback capabilities to manipulate a virtual tool. The manipulations of the virtual tool made by the human operator can be converted to instructions to the real-world tool corresponding to the virtual tool, so that the real-world tool can carry out the particular task in the real-world environment. Once the particular task is partially or fully completed, virtual fixtures that have been utilized to carry out (a portion of) the particular task can be removed from the virtual environment, and new virtual fixtures related to a task after the particular task can be added. In some embodiments, method 500 can end when all of the one or more haptic navigation sessions of block 570 are completed.

Specifically, FIG. 5B is a flow chart for an embodiment of method 500 related to generating virtual fixtures based on scans of an environment, in accordance with an example embodiment. In particular, FIG. 5B an embodiment of shows blocks 560 and 570 of method 500—the remainder of method 500 remains the same in this embodiment. FIG. 5B shows that, in this embodiment, block 560 of method 500 for generating/defining haptic virtual fixtures includes sub-blocks 562, 564, and 566. And, in this embodiment, block 570 of method 500 for conducting haptic navigation with virtual fixtures includes sub-blocks 572 and 574.

At sub-block 562 of block 560, a robotic tool in a real-world environment, such as but not limited to one or more ROVs, robots, effectuators, actuators, and/or sensors, are moved into a scanning position that is suitable to take one or more scans of one or more objects in the real-world object.

At sub-block 564 of block 560, the robotic tool can take the one or more scans of one or more objects in the real-world object to obtain scan-related data, such as, but not limited to, depth data, images, and/or sensor data, about the one or more objects.

At sub-block 566 of block 560, the scan-related data is utilized to generate one or more virtual fixtures (VFs) related to the one or more objects. In some embodiments, some or all of the one or more generated virtual fixtures can be modified by a human operator (or other entity) such as discussed above in the context of FIG. 5A. After the one or more virtual fixtures are generated, the one or more virtual fixtures can be placed in a virtual environment for use in one or more haptic navigation sessions, where the haptic navigation sessions can be carried out using the techniques of block 570 of FIGS. 5A and/or 5B.

At sub-block 572 of block 570, one or more haptic navigation sessions can be conducted such as discussed above in the context of FIG. 5A. In some embodiments, method 500 can end when all of the one or more haptic navigation sessions are completed such as discussed above in the context of FIG. 5A.

During the one or more haptic navigation sessions, a virtual fixture may not be suitable for carrying out a task. In this case, a new virtual fixture may be generated from one or more rescans of the real-world environment.

At sub-block 574 of block 570, a determination is made as to whether a rescan of the real-world environment should be requested; i.e., to generate a new virtual fixture. If the rescan of the real-world environment is to be requested, method 500 can continue at sub-block 562 of block 560. Otherwise, the rescan of the real-world environment is not requested and method 500 can continue at sub-block 572 of block 570.

Figure 6B:
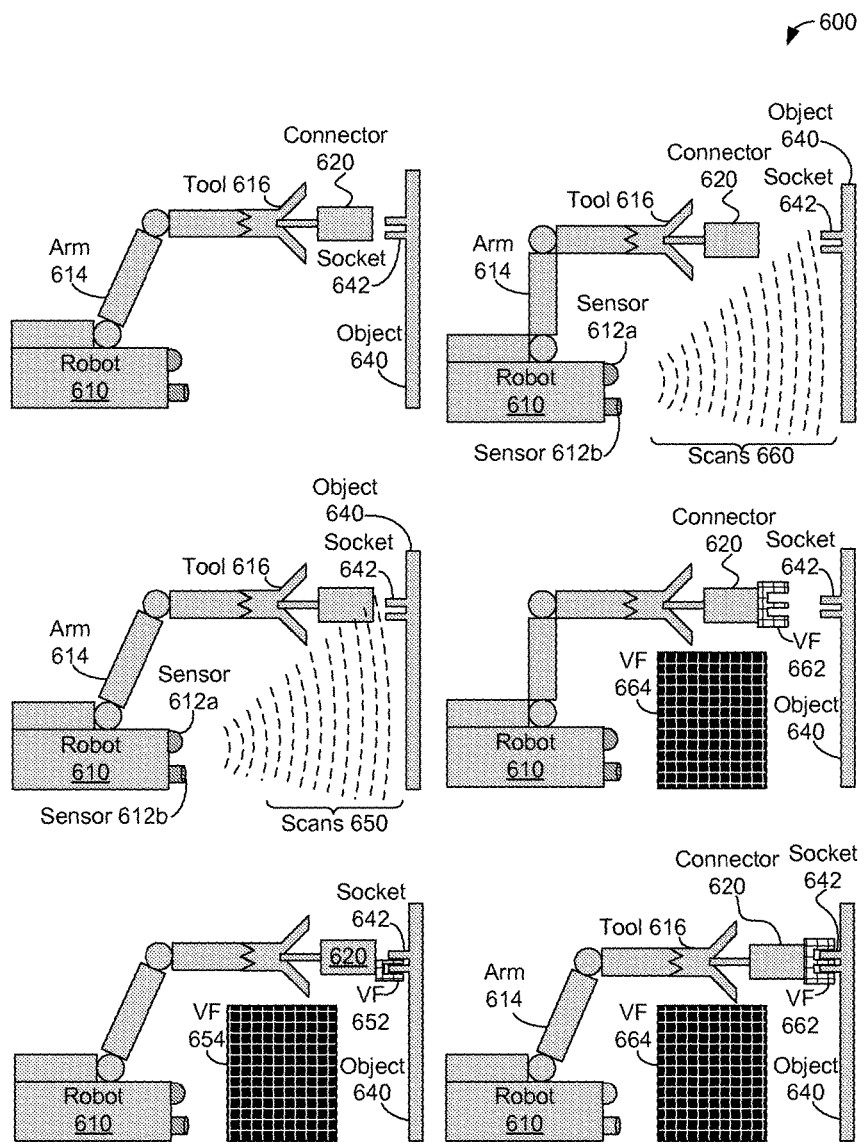

FIGS. 6A and 6B depict scenario 600 related to method 500, in accordance with an example embodiment. FIGS. 6A and 6B show example images of a virtual environment that represents a real-world environment. In scenario 600, the real-world environment includes a robot having robotic arms, a robotic tool, and two sensors, and an object that is to be manipulated by the robot as part of a task. As shown in FIGS. 6A and 6B, a computing device CD1 is generating a virtual environment where the real-world robot is represented by robot 610, which includes sensors 612a and 612b, arm 614, and tool 616, and the object is represented by object 618 in FIGS. 6A and 6B. Computing device CD1 can be a computing device such as computing device 424 of system 400 and/or computing device 820 discussed in the context of FIG. 8B, that is configured to carry out method 500.

At the onset of scenario 600, object 618 includes connector 620 as shown in the topmost image of FIG. 6A and computing device CD1 controlling robot 610 via a haptic navigation session. In particular, computing device CD1 is about to carry out the techniques of sub-block 562 of block 560; that is, computing device CD1 is about to instruct robot 610 to scan the object corresponding to object 618, as indicated by the topmost image of FIG. 6A. Then, the robot takes one or more scans of the object as indicated at sub-block 564 of block 560, as indicated in the second to topmost image of FIG. 6A, where sensors 612a and 612b indicated as taking scans 622 of object 618. In particular, scans 622 are intended to obtain data about connector 620, and the data about the scans is provided to computing device CD1.

Once the scans are complete, computing device CD1 generates a virtual fixture from the scans using the techniques of sub-block 566 of block 560. The virtual fixture is configured to aid a human operator in positioning an actual tool (corresponding to tool 616) to connect with an actual connector that corresponds to connector 620. The virtual fixture can aid a human operator participating in the haptic navigation session in ascertaining the task is being carried out both with the tool being correctly positioned and rotated and that task is operating on the correct connector having the right shape and size. In scenario 600, virtual fixture 630 is generated from the data obtained by scans 622.

As shown in third-from-topmost image of FIG. 6A, virtual fixture 630 can be designed as an inverted shape of connector 620 and indicated in the virtual environment as being connected to tool 616. For example, virtual fixture 630 includes a cavity having several aspects (As) that include aspect 632*a* and 632*b*, where the aspects of the cavity of virtual fixture 630 match corresponding aspects of connector 620. In this example, aspect 632*a* of virtual fixture 630 matches aspect 634*a* of connector 620, and aspect 632*b* of virtual fixture 630 matches aspect 634*b* of connector 620.

As virtual fixture 630 is shown as connected to tool 616, then alignment of aspects of virtual fixture 630 with aspects of connector 620 can indicate partial or complete alignment of tool 616 with connector 620, and therefore indicate partial or complete alignment of the real-world tool with the real-world connector. For example, if aspect 632*a* of virtual fixture 630 aligns with aspect 634*a* of connector 620 so that the cavity of virtual fixture 630 would fit over aspect 634*a* of connector 620, then virtual fixture 630 is at least partially aligned in one axis (or dimension) with connector 620. As another example, if both aspects 632*a* and 632*b* of virtual fixture 630 are aligned with respective aspects 634*a* and 634*b* of connector 620 so that the cavity of virtual fixture 630 would fit over aspect 634*a* of connector 620, then virtual fixture 630 can be considered to be at least partially aligned in two axes (or dimensions) with connector 620. Other alignments are possible as well.

Scenario 600 can continue by using computing device CD1 and the human operator using haptic navigation techniques of block 570 of method 500 to maneuver the real-world robot into position to grab the connector from the object. As shown in the lowest image of FIG. 6A, in the virtual environment corresponding to the real-world environment and used in the haptic navigation techniques of block 570, robot 610 has moved arm 614 and tool 616 so that the cavity of virtual fixture 630 is aligned with connector 620.

Scenario 600 continues with the real-world robot grabbing the connector from the object and moving to another object that has a socket that can be manipulated using the connector. As shown at upper-left of FIG. 6B, the virtual environment provided by computing device CD1 can update the representation of robot 610 to at least: (i) remove virtual fixture 630 from being connected to tool 616, (ii) to show connector 620 as being attached to tool 616, and (iii) show robot 610 now being near object 640 with socket 642—previously, robot 610 was shown near object 618, not object 640.

In scenario 600, during the haptic navigation session, the human operator determines that one or more virtual fixtures would be useful to position the connector to work on the socket. The human operator then determines that a scan of the socket and associated object would be useful to generate the suitable virtual fixture(s). Then, using the techniques of sub-block 574 of block 570, computing device CD1 can make a determination that a rescan of the real-world environment has been requested—for example, the human operator can click on, press, or otherwise select a button or other operator/command related to the virtual environment to request the rescan. In another example, a work plan to carry out task(s) related to the socket can have information that the rescan of the real-world environment should be requested when the robot is proximate to the object (or based on other criteria).

Then, after completing sub-block 574, method 500 can proceed to sub-block 562 of block 560. At sub-block 562, the robot is determined to be in position to take a scan of the object and socket, and so method 500 can proceed to use the techniques of sub-block 564 to scan the real-world environment, including the object and the socket. As shown at center-left of FIG. 6B, robot 610 takes scans 650 of object 640 including socket 642 using the techniques of sub-block 564 of block 560.

Once scans 650 are complete, the techniques of sub-block 566 of block 560 are used to generate two virtual fixtures from these scans. As shown at lower-left of FIG. 6B, virtual fixture 652 can be designed as an inverted shape of socket 642 and indicated in the virtual environment as being connected to connector 620, and virtual fixture 654 can be a forbidden region fixture indicating a region close to object 640 where robot 610 is restricted; e.g., object 640 could be fragile and so should be protected from contact by robot 610 and/or the real-world region related to the region forbidden by virtual fixture 654 could be hazardous to the real-world robot.

Scenario 600 continues with the techniques of block 570 being used to proceed with a haptic navigation session using virtual fixtures 652 and 654. During the haptic navigation session, the human operator determines that virtual fixture 652 is not suitable for positioning the connector to work on the socket. The human operator then determines that another scan of the socket and associated object would be useful to generate the suitable virtual fixture(s). Before requesting the rescan, the human operator moves the arm of the robot back to give the robot's sensors an unobstructed view of the socket.

Using the techniques of sub-block 574 of block 570, a determination can be made that a rescan of the real-world environment has been requested such as discussed above regarding scans 650 of scenario 600. Then, after completing sub-block 574, method 500 can proceed to sub-block 562 of block 560. At sub-block 562, the robot is determined to be in position to take a scan of the object and socket as the connector has been moved out of the way of the socket. Method 500 can proceed to use the techniques of sub-block 564 to scan the real-world environment, including the object and the socket. As shown at upper-right of FIG. 6B, robot 610 takes scans 660 of object 640 including socket 642 using the techniques of sub-block 564 of block 560. Note that arm 614 has been moved to back connector 620 from socket 642 of object 642 to give sensors 612*a*, 612*b* a better view of socket 642, as discussed above.

Once scans 660 are complete, the techniques of sub-block 566 of block 560 are used to generate two virtual fixtures from these scans. As shown at center-right of FIG. 6B, virtual fixture 662 can be designed as an inverted shape of socket 642 and indicated in the virtual environment as being connected to connector 620, and virtual fixture 664 can be a forbidden region fixture similar to virtual fixture 654 discussed above.

Scenario 600 continues with the techniques of block 570 being used to proceed with a haptic navigation session using virtual fixtures 662 and 664. During the haptic navigation session, the human operator determines that virtual fixture 652 is suitable for positioning the connector to work on the socket and moves the connector in position to operate on the socket. As shown at lower-right of FIG. 6B, robot 610 has been moved into a position where virtual fixture 662 fits with socket 642. As virtual fixture 662 fits with socket 642, the real-world connector corresponding to connector 620 is aligned for operating on the real-world socket corresponding to socket 642 in the virtual environment. Scenario 600 is complete after the connector properly operates upon the socket to complete the task.

Example Environments for Haptic Rendering

Figure 7A:
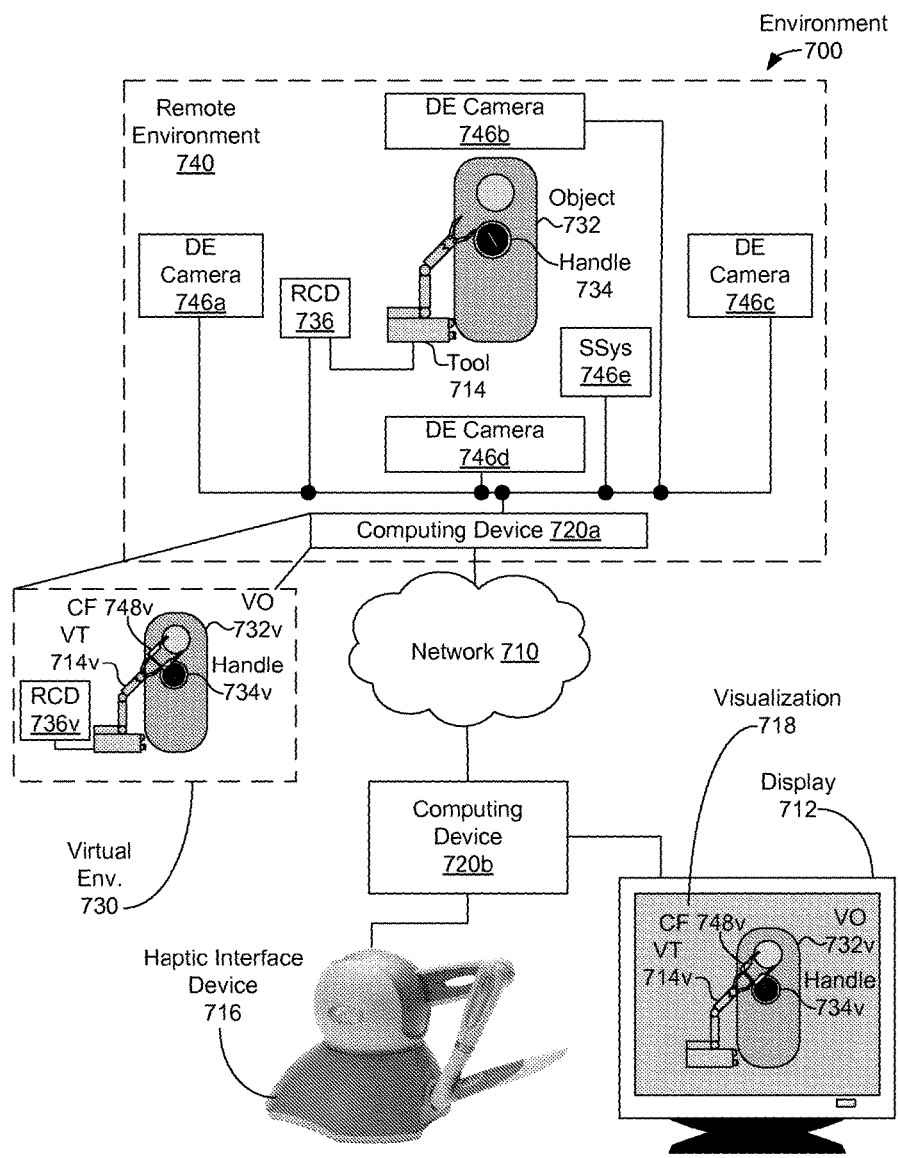
FIG. 7A is a diagram of a haptic rendering environment, in accordance with an example embodiment.

FIG. 7A is a diagram of a haptic rendering environment 700, in accordance with an example embodiment. Environment 700 includes computing devices 720a, 720b connected via network 710. Computing device 720a is in remote environment 740 and is additionally connected to remote controlled device (RCD) 736, depth-enabled (DE) cameras 746a-746d, and sensor system 746e. Remote controlled device 736 is connected to tool 714. Computing device 720b is additionally connected to display 712 and haptic feedback device 716.

In the example shown in FIG. 7A, sensor system 746e is a sensor system configured to provide data form sensors to computing device 720a. Sensor system 746e can be a sensor system such as discussed above in the context of sensor systems 142, 144, 152 of FIG. 1. In some cases, sensor system 746e can be configured to capture range measurements of remote controlled device 736 and objects 742, 744 and provide the captured depth data to computing device 720a.

In the example shown in FIG. 7A, each of depth-enabled cameras 746a-746d is configured to capture range measurements of remote controlled device 736 and objects 742, 744 and provide the captured range measurements to computing device 720a. In some embodiments, each of depth-enabled cameras 746a-746d can be configured with an optical still and/or video camera to capture image data and an infrared camera to capture depth/range data.

One range measurement example is a depth image having observed color and depth values. The depth image can be received as a NR×NC matrix of pixels, with each pixel having 24 RGB bits of color value information, including 8 bits of data for each of red, green and blue component colors. The depth values can be received as a NR×NC matrix, where each depth value has $B_d$ bits. For one example depth-enabled camera, the Kinect camera uses NR=640, NC=480, and $B_d$=11 or 13, and so produces 640×480 matrices of image data and depth data, where each depth value has at least 11 bits. The Kinect camera can simultaneously provide both image and depth data at a frame rate $f_c$ of 30 Hz. The depth values can represent depth relative to the camera ranging from Dmin to Dmax, with Dmin representing a minimum distance from the camera, e.g., 0 mm; and Dmax, e.g., 2048 or 8192 mm. Color and/or depth values can have additional information, such as device information about the camera capturing the depth image.

In some embodiments, computing device 720a can be connected to more or fewer depth-enabled cameras and/or sensor systems than shown in FIG. 7A, while remaining connected to at least one depth-enabled camera or sensor system. In other embodiments, a depth-enabled camera can generate other types of depth data than depth images; e.g., range/depth-only information, point clouds. In yet other embodiments, devices other than depth-enabled cameras can provide depth data; e.g., sensor system 746e.

Computing device 720a can use received depth data to generate virtual environment 730. In order to interpret the depth data, computing device 720a can transform the depth data into a collection of points, each point specified in a Cartesian coordinate system in three dimensions; e.g., as an (x, y, z) point in coordinate system 200 discussed above in the context of FIG. 2.

Each (x, y, z) point from the depth data can represent one point in a "point cloud" or collection of points in three-dimensional Cartesian space; e.g., $(x, y, z) \in \mathbb{R}^3$. In other embodiments, other data structures than point clouds or other collections of points can be generated from depth data. After generating the collection of points, computing device 720a can render virtual environment 730 as images and/or as a three dimensional visualization. FIG. 7A shows virtual environment 730 including virtual objects (VOs) 732v, virtual valve 734v, virtual remote controlled device 736v, and a representative virtual tool 714v.

Computing device 720a and remote environment 740 can be physically distant from computing device 720b. In some scenarios, remote environment 740 can be physically near or in the same environment as an environment around computing device 720b. In particular, of these scenarios not shown in the Figures, one computing device can provide the herein-described functionality of computing devices 720a and 720b.

Computing device 720a can generate force vectors related to tool 714 and send indications of haptic feedback to computing device 720b. Upon reception of the indications of haptic feedback, computing device 720b can direct haptic interface device 716 to generate haptic feedback in accord with the indications of haptic feedback. Additionally, computing device 720a and/or 720b can generate visualization 718 with virtual tool 714v, virtual object 732v, virtual valve 734v, and combination fixture 748v connected to virtual tool 714v. As also shown in FIG. 7A, visualization 718 can include an indication of virtual tool 714v which can correspond to virtual tool 714v in virtual environment 730 and/or tool 714 in remote environment 740. Visualization 718 is further discussed below in the context of FIG. 7B.

Haptic interface device 716 can be a controllable mechanism configured to receive indications of haptic feedback and provide the indicated haptic feedback based on the indications. Example haptic interface devices 716 include, but are not limited to a delta.6 haptic interface from Force Dimension, a PHANTOM Omni® Haptic Device from Sensable Inc., other haptic devices, other haptic interfaces, haptic gloves, tactile displays, devices configured at least in part to provide haptic feedback such as laptop computers, desktop computers, mobile telephones, haptic suits, and/or other devices.

As haptic interface device 716 is moved, indication(s) of movement of haptic interface device 716 can be generated and sent from computing device 720b, such as to computing device 720a via network 710. Upon reception of the indication(s) of movement, computing device 720a can update a position of virtual tool 714v. Also or instead, computing device 720a can send control signals to change movement and/or rotation; e.g., change speed, direction, acceleration, pitch, yaw, roll, or to stop) to remote controlled device 736 to move tool 714 accordingly. In other embodiments, virtual tool 714v can represent a position of tool(s), sensor(s), and/or other device(s) on remote controlled device 736 other than tool 714, and by sending control signals remote controlled device 736, the tool(s), sensor(s), and/or other device(s) can be moved.

As depth data of remote environment 740 are captured, the captured depth data can correspond to images and points showing movement and/or rotation of remote controlled device 736 and/or tool 714 and thus showing movement and/or rotation of virtual tool 714v. In some embodiments, virtual remote controlled device 736v and/or virtual tool 714v can be moved within virtual environment 730 based on the indication(s) of movement/rotation instead of or as well as based on captured image and depth data.

Figure 7B:
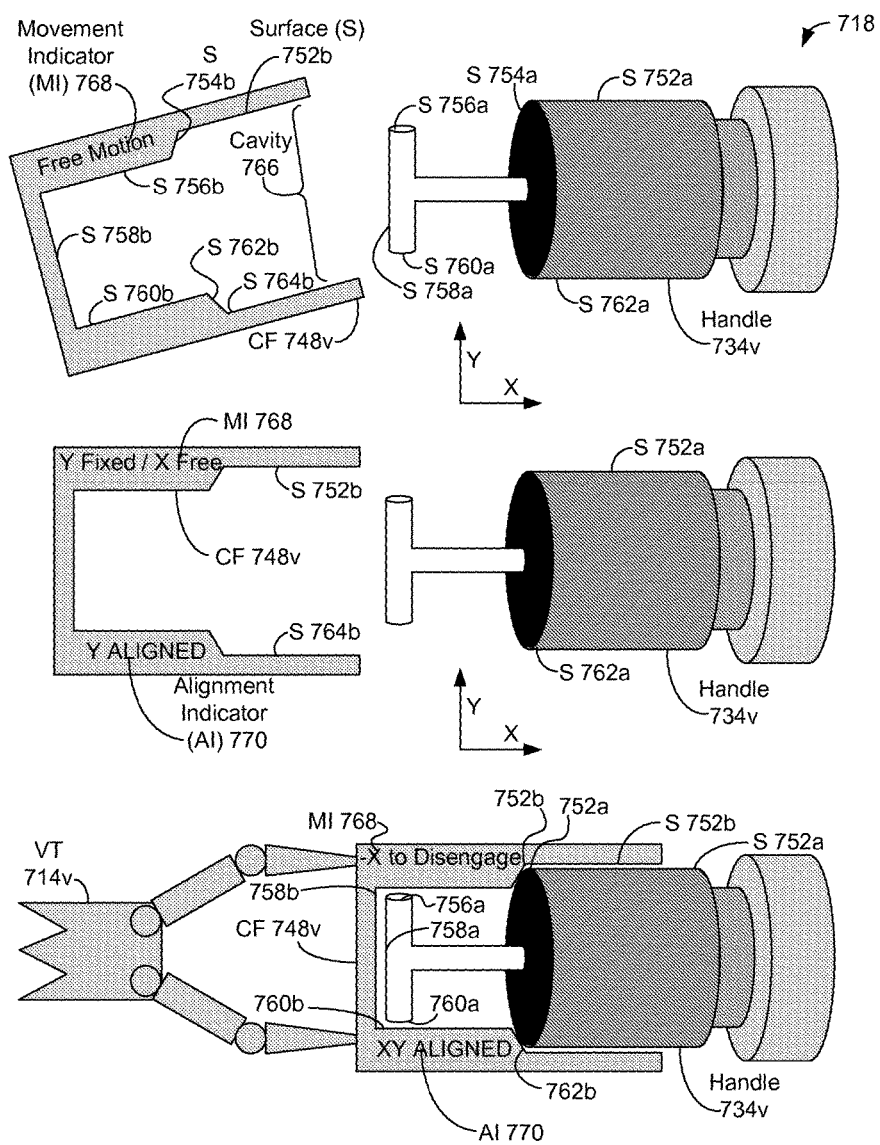
FIG. 7B shows close-up illustrations of a display of a visualization in the haptic rendering environment of FIG. 7A, in accordance with an example embodiment.

FIG. 7B shows close-up illustrations of visualization 718 of environment 700 shown in FIG. 7A, in accordance with an example embodiment. In particular, an upper portion of FIG. 7B illustrates a combination fixture 748v relatively near to virtual handle 734v but combination fixture 748v is not aligned with virtual handle 734v using either an axis-based approach or a surface-based approach to determining alignment. Using an axis-based approach, each of an x-axis orientation, a y-axis orientation, and a z-axis orientation of virtual handle 734v differ enough (perhaps as determined using one or more threshold values of axial-orientation closeness) from an x-axis orientation, a y-axis orientation, and a z-axis orientation of combination fixture 748v as shown in the upper portion of FIG. 7B to indicate that combination fixture 748v is not aligned with virtual handle 734v.

Using a surface-based approach to alignment, orientations of each of respective surfaces 752a, 754a, 756a, 758a, 760a, and 762a of virtual handle 734v differ enough (perhaps as determined using one or more threshold values of surface-orientation closeness) from orientations of each of respective surfaces 752b, 754b, 756b, 758b, 760b, and 762b of cavity 766 in combination fixture 748v as shown in the upper portion of FIG. 7B to indicate that combination fixture 748v is not aligned with virtual handle 734v Movement indicator (MI) 768 of combination fixture 748v in the upper portion of FIG. 7B indicates that combination fixture 748v can be moved in "Free Motion", which also suggests that combination fixture 748v is not aligned with virtual handle 734v. In other embodiments, combination fixture 748v can be configured without movement indicator 768. In still other embodiments, combination fixture 748v can be configured with a movement indicator that provides additional visual feedback and/or auditory feedback related to a free motion condition.

In the center portion of FIG. 7B, visualization 718 has been updated based on movement of virtual tool 714v, and thereby based on movement of combination fixture 748v. In particular, combination fixture 748v has been moved to be in partial alignment with virtual handle 734v. Using an axis-based approach, the y-axis orientation of virtual handle 734v is now close enough to the y-axis orientation of combination fixture 748v as shown in the center portion of FIG. 7B to indicate that combination fixture 748v is aligned along the y-axis with virtual handle 734v.

A condition of y-axis alignment can be indicated by haptic feedback—if a human operator (or other entity) attempts to use haptic interface device 716 to move virtual tool 714v (and therefore combination fixture 748v) out of y-axis alignment with virtual handle 734v, haptic interface device 716 can provide force and torque feedback that feels like virtual tool 714v (strongly) resists the movement out of y-axis alignment. Movement indicator 768 of combination fixture 748v in the center portion of FIG. 7B also indicates that combination fixture 748v is "Fixed" in the "Y" dimension with "Free" motion in the "X" dimension, which also suggests that combination fixture 748v is y-axis aligned with virtual handle 734v. The condition of y-axis alignment is also indicated by alignment indicator (AI) 770 of combination fixture 748v showing "Y ALIGNED" in the center portion of FIG. 7B. In other embodiments, combination fixture 748v can be configured without alignment indicator 770. In even other embodiments, combination fixture 748v can be configured with an alignment indicator that provides additional visual feedback and/or auditory feedback related to a partially aligned and/or completely aligned condition.

Using a surface based approach to alignment, surface 752a of virtual handle 734v and surface 752b of combination fixture 748v can be considered to be aligned at least in the y-dimension, as y-axis coordinates and orientations of surface 752a of virtual handle 734v and surface 752b of combination fixture 748v are close enough (perhaps as determined by one or more threshold values of surface-orientation closeness between surfaces 752a and 752b) to be considered in alignment. Using similar measures (and perhaps similar threshold values), respective surfaces 756a, 760a, and 762a of virtual handle 734v can be considered to be aligned in the y dimension with respective surfaces 756b, 760b, and 762b of combination fixture 748v.

In some embodiments, the human operator (or other entity) can determine partial and/or complete alignment between virtual fixtures and/or virtual objects; e.g., the human operator can determine surface and/or axial alignment between of virtual handle 734v and combination fixture 748v. In particular of these embodiments, the human operator (or other entity) can signal computing device 720b that virtual fixtures and/or virtual objects are in partial or complete alignment; for example, the signal can be generated via a graphical user interface associated with display 712 and/or via a button or other control of haptic interface device 716.

In the lower portion of FIG. 7B, visualization 718 has been updated based on movement of virtual tool 714v, and thereby based on movement of combination fixture 748v. In particular, combination fixture 748v has been moved to be complete alignment with virtual handle 734v, indicating that tool 714 is in position to operate on handle 734 in remote environment 740. Using an axis-based approach, both the x-axis and y-axis orientations of virtual handle 734v are now close enough to the y-axis orientation of combination fixture 748v as shown in the center portion of FIG. 7B to indicate that combination fixture 748v is aligned along the y-axis with virtual handle 734v.

A condition of complete alignment can be indicated by haptic feedback—if a human operator (or other entity) attempts to use haptic interface device 716 to move virtual tool 714v (and therefore combination fixture 748v) out of x-axis and y-axis (and in some embodiments, z-axis) alignment with virtual handle 734v, haptic interface device 716 can provide force and torque feedback that feels like virtual tool 714v (strongly) resists the movement out of either x-axis or y-axis alignment. In particular embodiments, an exception to the "resist out-of-alignment" haptic feedback is that no haptic feedback may be provided if movement of virtual tool 714v (and corresponding movement of combination fixture 748b) is in a direction understood be disengaging from virtual handle 734—movement indicator 768 at the lower portion of FIG. 7B indicates movement in the "–X" direction is understood as movement "to disengage", which also suggests that combination fixture 748v is completely aligned with virtual handle 734v. The condition of complete alignment is also indicated by alignment indicator 770 showing "XY ALIGNED" in the lower portion of FIG. 7B.

Using a surface based approach to alignment, each of respective surfaces 752a, 754a, 756a, 758a, 760a, and 762a of virtual handle 734v can be considered to be aligned in at least the x and y dimensions with respective surfaces 752b, 754b, 756b, 758b, 760b, and 762a of combination fixture 748v, as at least x-axis and y-axis coordinates and orientations of each of surfaces 752a-762a of virtual handle 734v are close enough (perhaps as determined by one or more threshold values of surface-orientation closeness between respective surfaces 752a-762a and respective corresponding surfaces 752b-762b) to each of respective surfaces 752b-762b of combination fixture 748v be considered in at least x-axis and y-axis alignment.

An Example Computing Network

Figure 8A:
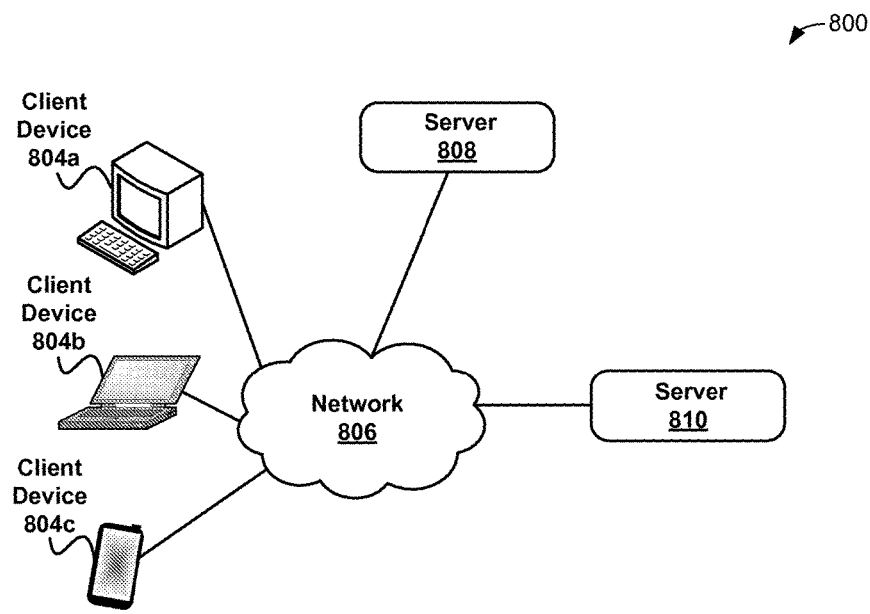
FIG. 8A is a block diagram of a computing environment, in accordance with an example embodiment.

FIG. 8A depicts a network 800 in accordance with an example embodiment. In FIG. 8A, servers 808 and 810 are configured to communicate, via a network 806, with client devices 804a, 804b, and 804c. As shown in FIG. 8A, client devices can include a personal computer 804a, a laptop computer 804b, and a smart-phone 804c. More generally, client devices 804a-804c (or any additional client devices) can be any sort of computing device, such as a workstation, network terminal, desktop computer, laptop computer, wireless communication device (e.g., a cell phone or smart phone), and so on.

The network 806 can correspond to a local area network, a wide area network, a corporate intranet, the public Internet, combinations thereof, or any other type of network(s) configured to provide communication between networked computing devices. Servers 808 and 810 can share content and/or provide content to client devices 804a-804c. As shown in FIG. 8A, servers 808 and 810 are not physically at the same location. Alternatively, servers 808 and 810 can be co-located, and/or can be accessible via a network separate from network 806. Although FIG. 8A shows three client devices and two servers, network 806 can service more or fewer than three client devices and/or more or fewer than two servers.

An Example Computing Device

Figure 8B:
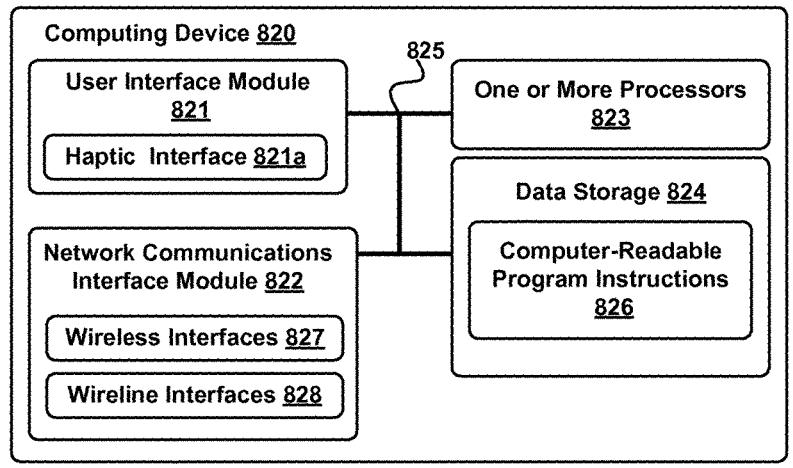
FIG. 8B is a block diagram of an example computing device, in accordance with an example embodiment.

FIG. 8B is a block diagram of an example computing device 820 including user interface module 821, network-communication interface module 822, one or more processors 823, and data storage 824, in accordance with embodiments of the invention.

In particular, computing device 820 shown in FIG. 8A can be configured to perform one or more functions of surface vessel 110, sensor systems 142, 144, 152, ROV 162, tools 220, 222, VRobot 340, master console 510, networks 420, 710, 806, computing devices 424, 720a, 720b, cameras 480, 746a-746d, depth sensor 482, robots 484, 610, display 712, remote controlled device 736, client devices 804a-804c, servers 808, 810, and/or to implement at least part of scenarios 100, 200, 360, 600, virtual environments 230, 730, virtual fixtures 300, 310, 312, 320, 322, 330, 332, 362, 630, 652, 662, 748v, virtual attraction point 374, methods 500, environment 700, visualization 718, virtual tool 714v, virtual object 732v, virtual handle 734v, and/or virtual remote controlled device 736v. Computing device 820 can include a user interface module 821, a network-communication interface module 822, one or more processors 823, and data storage 824, all of which may be linked together via a system bus, network, or other connection mechanism 825.

Computing device 820 can be a desktop computer, laptop or notebook computer, personal data assistant (PDA), mobile phone, embedded processor, or any similar device that is equipped with at least one processing unit capable of executing machine-language instructions that implement at least part of the herein-described techniques and methods, including but not limited to functionality related to scenarios 100, 200, 360, and/or 600 and/or methods 500 and/or 900.

User interface 821 can receive input and/or provide output, perhaps to a user. User interface 821 can be configured to send and/or receive data to and/or from user input from input device(s), such as a keyboard, a keypad, a touch screen, a computer mouse, a track ball, a joystick, and/or other similar devices configured to receive user input from a user of the computing device 820. User interface 821 can be configured to provide output to output display devices, such as. one or more cathode ray tubes (CRTs), liquid crystal displays (LCDs), light emitting diodes (LEDs), displays using digital light processing (DLP) technology, printers, light bulbs, and/or other similar devices capable of displaying graphical, textual, and/or numerical information to a user of computing device 820. User interface module 821 can also be configured to generate audible output(s), such as a speaker, speaker jack, audio output port, audio output device, earphones, and/or other similar devices configured to convey sound and/or audible information to a user of computing device 820. As shown in FIG. 8B, user interface module 821 can be configured with haptic interface 821a that can receive inputs related to a virtual tool and/or a haptic interface point (HIP), a remote device configured to be controlled by haptic interface 821a, and/or other inputs, and provide haptic outputs such as tactile feedback, vibrations, forces, motions, and/or other touch-related outputs.

Network-communication interface module 822 can be configured to send and receive data over wireless interfaces 827 and/or wired interfaces 828 via a network, such as network 806. Wired interface(s) 828, if present, can include a wire, cable, fiber-optic link and/or similar physical connection to a data network, such as a wide area network (WAN), a local area network (LAN), one or more public data networks, such as the Internet, one or more private data networks, or any combination of such networks. Wireless interface(s) 827 if present, can utilize an air interface, such as a ZigBee, Wi-Fi, and/or WiMAX interface to a data network, such as a WAN, a LAN, one or more public data networks (e.g., the Internet), one or more private data networks, or any combination of public and private data networks.

In some embodiments, network-communication interface module 822 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well as or in addition to those listed herein to secure (and then decrypt/decode) communications.

Processor(s) 823 can include one or more central processing units, computer processors, mobile processors, digital signal processors (DSPs), GPUs, microprocessors, computer chips, and/or other processing units configured to execute machine-language instructions and process data. Processor(s) 823 can be configured to execute computer-readable program instructions 826 that are contained in data storage 824 and/or other instructions as described herein.

Data storage 824 can include one or more physical and/or non-transitory storage devices, such as read-only memory (ROM), random access memory (RAM), removable-disk-drive memory, hard-disk memory, magnetic-tape memory, flash memory, and/or other storage devices. Data storage 824 can include one or more physical and/or non-transitory storage devices with at least enough combined storage capacity to contain computer-readable program instructions 826 and any associated/related data structures.

Computer-readable program instructions 826 and any data structures contained in data storage 826 include computer-readable program instructions executable by processor(s) 823 and any storage required, respectively, at least to perform functionality related to the herein-described scenarios and/or methods, including but not limited to functionality related to scenarios 100, 200, 360, and/or 600 and/or methods 500 and/or 900. Computer-readable program instructions 826 can include instructions that when executed by processor(s) 823 to perform at least the herein-described functionality of software.

An Example Method for Providing a Virtual Environment

Figure 9:
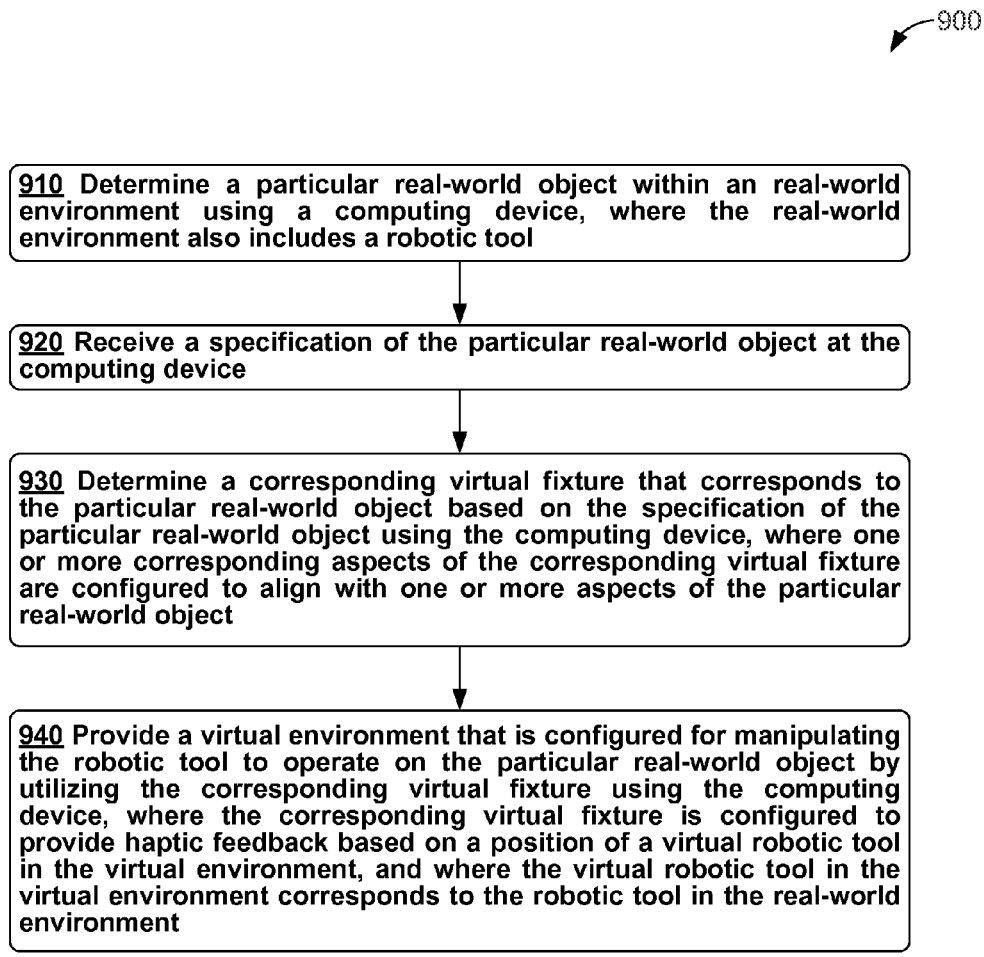
FIG. 9 is a flowchart of a method, in accordance with an example embodiment.

FIG. 9 is a flowchart depicting example functional blocks of an example method 900. Method 900 can be carried out by a computing device, such as computing device 424 of system 400 of FIG. 4 and/or computing device 820 discussed above in the context of FIG. 8B. Method 900 begins at block 910, where a computing device can determine a particular real-world object within a real-world environment that also includes a robotic tool, such as discussed above in the context of at least FIGS. 1-7B.

At block 920, the computing device can receiving a specification of the particular real-world object, such as discussed above in detail in the context of at least FIGS. 4, 5A, 5B, 6A, and 6B. In some embodiments, receiving the specification of the particular real-world object can include receiving one or more scans of the particular real-world object. The one or more scans can be taken using one or more sensors associated with the robotic tool, such as discussed above in detail in the context of at least FIGS. 4, 5A, 5B, 6A, and 6B. In particular of these embodiments, receiving the one or more scans can include: requesting that the robotic tool be positioned in the real-world environment to enable the one or more sensors to sense the particular real-world object; after the robotic tool is positioned, receiving the one or more scans of the particular real-world object; and determining the corresponding virtual fixture based on the one or more scans, such as discussed above in detail in the context of at least FIGS. 4, 5B, 6A, and 6B.

In more particular of these embodiments, the corresponding virtual fixture can include a first particular surface, where the first particular surface is a corresponding aspect of the one or more corresponding aspects of the corresponding virtual fixture, such as discussed above in detail in the context of at least FIGS. 4, 5B, 6A, and 6B. In even more particular of these embodiments, the particular real-world object can include a second particular surface. Then, the first particular surface can be configured to align with the second particular surface, such as discussed above in detail in the context of at least FIGS. 4, 5B, 6A, and 6B.

At block 930, the computing device can determine a corresponding virtual fixture that corresponds to the particular real-world object based on the specification of the particular real-world object. One or more corresponding aspects of the corresponding virtual fixture can be configured to align with one or more aspects of the particular real-world object, such as discussed above in detail in the context of at least FIGS. 4, 5A, 5B, 6A, 6B, and 7B. In some embodiments, determining the corresponding virtual fixture can include the computing device generating the corresponding virtual fixture based on sensor data from the one or more scans, such as discussed above in detail in the context of at least FIGS. 4, 5A, 5B, 6A, and 6B. In other embodiments, determining the corresponding virtual fixture can include requesting a search for the corresponding virtual fixture from among a predetermined plurality of virtual fixtures, such as discussed above in detail in the context of at least FIGS. 4 and 5B.

At block 940, the computing device can provide a virtual environment. The virtual environment can be configured for manipulating the robotic tool to operate on the particular real-world object by utilizing the corresponding virtual fixture. The corresponding virtual fixture can be configured to provide haptic feedback based on a position of a virtual robotic tool in the virtual environment, where the virtual robotic tool in the virtual environment corresponds to the robotic tool in the real-world environment, such as discussed above in the context of at least FIGS. 2-7B.

In some embodiments, providing the virtual environment can include: manipulating the robotic tool to align with the real-world object in a first dimension using the virtual environment; after the robotic tool is aligned with the real-world object in the first dimension, attempting to manipulate the robotic tool to not align with the real-world object in the first dimension using the virtual environment; and while attempting to manipulate the robotic tool to not align with the real-world object in the first dimension, receiving at least haptic feedback via the corresponding virtual tool displayed in the virtual environment to stop manipulating the robotic tool to not align with the real-world object, such as discussed above in detail in the context of at least FIGS. 4, 5B, 6A, 6B, and 7B. In particular of these embodiments, manipulating the robotic tool to align with the real-world object in the first dimension using the virtual environment includes determining that at least one corresponding aspect of the corresponding virtual fixture is aligned with at least one aspect of particular real-world object in at least the first dimension, such as discussed above in detail in the context of at least FIGS. 4, 5B, 6A, 6B, and 7B.

In some embodiments, method 900 can also include determining a work plan to accomplish one or more tasks in the real-world environment, where at least one task of the one or more tasks involves the particular real-world object and the work plan for the at least one task includes a reference to the corresponding virtual fixture, such as discussed above in detail in the context of at least FIGS. 4, 5B, 6A, and 6B. In particular, method 900 can also include: determining an action performed by the robotic tool associated with the one or more tasks; generating a record of the action performed by the robotic tool; and storing the record in a log, such as discussed above in detail in the context of at least FIG. 4.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include physical and/or non-transitory computer readable media such as computer-readable media that stores data for short periods of time like register memory, processor cache, and random access memory (RAM). The computer readable media may also include physical and/or non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

The terms physical and/or tangible computer-readable medium and physical and/or tangible computer-readable media refer to any physical and/or tangible medium that can be configured to store instructions for execution by a processor, processing unit and/or computing device. Such a medium or media can take many forms, including but not limited to, non-volatile media and volatile media. Non-volatile media includes, for example, read only memory (ROM), flash memory, magnetic-disk memory, optical-disk memory, removable-disk memory, magnetic-tape memory, hard drive devices, compact disc ROMs (CD-ROMs), direct video disc ROMs (DVD-ROMs), computer diskettes, and/or paper cards. Volatile media include dynamic memory, such as main memory, cache memory, and/or random access memory (RAM). Many other types of tangible computer-readable media are possible as well. As such, the herein-described data storage can comprise and/or be one or more physical and/or tangible computer-readable media.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, comprising:
    determining a particular real-world object within a real-world environment using a computing device, wherein the real-world environment also comprises a robotic tool;
    receiving a specification of the particular real-world object at the computing device;
    determining a corresponding virtual fixture that corresponds to the particular real-world object based on the specification of the particular real-world object using the computing device, wherein one or more corresponding aspects of the corresponding virtual fixture are configured to align with one or more aspects of the particular real-world object; and
    providing a virtual environment that is configured for manipulating the robotic tool to operate on the particular real-world object by utilizing the corresponding virtual fixture using the computing device, wherein the corresponding virtual fixture comprises a combination fixture configured to provide haptic feedback based on a position of a virtual robotic tool in the virtual environment by at least:
        providing haptic feedback to direct the robotic tool into alignment with the one or more aspects of the particular real-world object, and
        after the robotic tool is aligned with the one or more aspects of the particular real-world object, providing haptic feedback to inhibit movement of the robotic tool out of alignment with the one or more aspects of the particular real-world object, and
    wherein the virtual robotic tool in the virtual environment corresponds to the robotic tool in the real-world environment.

2. The method of claim 1, wherein receiving the specification of the particular real-world object comprises receiving one or more scans of the particular real-world object, and wherein the one or more scans are taken using one or more sensors in the real-world environment.

3. The method of claim 2, wherein receiving the one or more scans comprises:
    requesting that the robotic tool be positioned in the real-world environment to enable the one or more sensors to sense the particular real-world object;
    after the robotic tool is positioned, receiving the one or more scans of the particular real-world object; and
    determining the corresponding virtual fixture based on the one or more scans.

4. The method of claim 3, wherein the corresponding virtual fixture comprises a first particular surface, and wherein the first particular surface is a corresponding aspect of the one or more corresponding aspects of the corresponding virtual fixture.

5. The method of claim 4, wherein the particular real-world object comprises a second particular surface, and wherein the first particular surface is configured to align with the second particular surface.

6. The method of claim 2, wherein determining the corresponding virtual fixture comprises generating the corresponding virtual fixture based on sensor data from the one or more scans using the computing device.

7. The method of claim 1, wherein determining the corresponding virtual fixture comprises requesting a search for the corresponding virtual fixture from among a predetermined plurality of virtual fixtures.

8. The method of claim 1, further comprising:
determining a work plan to accomplish one or more tasks in the real-world environment, wherein at least one task of the one or more tasks involves the particular real-world object, and wherein the work plan for the at least one task comprises a reference to the corresponding virtual fixture.

9. The method of claim 8, further comprising:
determining an action performed by the robotic tool associated with the one or more tasks;
generating a record of the action performed by the robotic tool; and
storing the record in a log.

10. The method of claim 1, wherein providing the virtual environment comprises:
manipulating the robotic tool to align with the particular real-world object in a first dimension using virtual robotic tool in the virtual environment;
after the robotic tool is aligned with the particular real-world object in the first dimension, attempting to manipulate the robotic tool to not align with the particular real-world object in the first dimension using the virtual robotic tool in the virtual environment; and
while attempting to manipulate the robotic tool to not align with the particular real-world object in the first dimension, receiving at least haptic feedback via the combination fixture to stop manipulating the robotic tool to not align with the particular real-world object.

11. The method of claim 10, wherein manipulating the robotic tool to align with the particular real-world object in the first dimension using the virtual environment comprises determining that at least one corresponding aspect of the corresponding virtual fixture is aligned with at least one aspect of the particular real-world object in at least the first dimension.

12. A computing device, comprising:
a processor; and
data storage, storing instructions that, upon execution by the processor, cause the computing device to perform functions comprising:
determining a particular real-world object within a real-world environment, wherein the real-world environment also comprises a robotic tool;
receiving a specification of the particular real-world object;
determining a corresponding virtual fixture that corresponds to the particular real-world object based on the specification of the particular real-world object, wherein one or more corresponding aspects of the corresponding virtual fixture are configured to align with one or more aspects of the particular real-world object; and
providing a virtual environment that is configured for manipulating the robotic tool to operate on the particular real-world object by utilizing the corresponding virtual fixture, wherein the corresponding virtual fixture comprises a combination fixture configured to provide haptic feedback based on a position of a virtual robotic tool in the virtual environment by at least:
providing haptic feedback to direct the robotic tool into alignment with the one or more aspects of the particular real-world object, and
after the robotic tool is aligned with the one or more aspects of the particular real-world object, providing haptic feedback to inhibit movement of the robotic tool out of alignment with the one or more aspects of the particular real-world object, and
wherein the virtual robotic tool in the virtual environment corresponds to the robotic tool in the real-world environment.

13. The computing device of claim 12, wherein receiving the specification of the particular real-world object comprises receiving one or more scans of the particular real-world object, and wherein the one or more scans are taken using one or more sensors in the real-world environment.

14. The computing device of claim 13, wherein receiving the one or more scans comprises:
requesting that the robotic tool be positioned in the real-world environment to enable the one or more sensors to sense the particular real-world object;
after the robotic tool is positioned, receiving the one or more scans of the particular real-world object; and
determining the corresponding virtual fixture based on the one or more scans.

15. The computing device of claim 13, wherein the corresponding virtual fixture comprises a first particular surface, and wherein the first particular surface is a corresponding aspect of the one or more corresponding aspects of the corresponding virtual fixture.

16. The computing device of claim 15, wherein the particular real-world object comprises a second particular surface, and wherein the first particular surface is configured to align with the second particular surface.

17. The computing device of claim 13, wherein determining the corresponding virtual fixture comprises generating the corresponding virtual fixture based on sensor data from the one or more scans using the computing device.

18. The computing device of claim 12, wherein the functions further comprise:
determining a work plan to accomplish one or more tasks in the real-world environment, wherein at least one task of the one or more tasks involves the particular real-world object, and wherein the work plan for the at least one task comprises a reference to the corresponding virtual fixture;
determining an action performed by the robotic tool associated with the one or more tasks;
generating a record of the action performed by the robotic tool; and
storing the record in a log.

19. The computing device of claim 12, wherein providing the virtual environment comprises:
manipulating the robotic tool to align with the particular real-world object in a first dimension using the virtual environment so that at least one corresponding aspect of the corresponding virtual fixture is aligned with at least one aspect of the particular real-world object in at least the first dimension;
after the robotic tool is aligned with the particular real-world object in the first dimension, attempting to manipulate the robotic tool to not align with the particular real-world object in the first dimension using the virtual environment; and
while attempting to manipulate the robotic tool to not align with the particular real-world object in the first dimension, receiving at least haptic feedback via the combination fixture to stop manipulating the robotic tool to not align with the particular real-world object.

20. An article of manufacture, comprising a physical computer-readable storage medium storing instructions that, upon execution by a processor of the article of manufacture, cause the article of manufacture to perform functions comprising:

determining a particular real-world object within a real-world environment, wherein the real-world environment also comprises a robotic tool;

receiving a specification of the particular real-world object;

determining a corresponding virtual fixture that corresponds to the particular real-world object based on the specification of the particular real-world object, wherein one or more corresponding aspects of the corresponding virtual fixture are configured to align with one or more aspects of the particular real-world object; and providing a virtual environment that is configured for manipulating the robotic tool to operate on the particular real-world object by utilizing the corresponding virtual fixture, wherein the corresponding virtual fixture comprises a combination fixture configured to provide haptic feedback based on a position of a virtual robotic tool in the virtual environment by at least:

providing haptic feedback to direct the robotic tool into alignment with the one or more aspects of the particular real-world object, and after the robotic tool is aligned with the one or more aspects of the particular real-world object, providing haptic feedback to inhibit movement of the robotic tool out of alignment with the one or more aspects of the particular real-world object, and wherein the virtual robotic tool in the virtual environment corresponds to the robotic tool in the real-world environment.

21. The article of manufacture of claim 20, wherein receiving the specification of the particular real-world object comprises receiving one or more scans of the particular real-world object, and wherein the one or more scans are taken using one or more sensors in the real-world environment.

* * * * *